(12) United States Patent
Banus

(10) Patent No.: US 9,221,191 B2
(45) Date of Patent: *Dec. 29, 2015

(54) VACUUM VIBRATION PRESS FOR FORMING ENGINEERED COMPOSITE STONE SLABS

(71) Applicant: Christopher T. Banus, Nashua, NH (US)

(72) Inventor: Christopher T. Banus, Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/729,823

(22) Filed: Jun. 3, 2015

(65) Prior Publication Data

US 2015/0266204 A1 Sep. 24, 2015

Related U.S. Application Data

(63) Continuation-in-part of application No. 14/222,695, filed on Mar. 24, 2014, now Pat. No. 9,073,239, which is a continuation-in-part of application No. 13/875,691, filed on May 2, 2013, now abandoned, (Continued)

(51) Int. Cl.
*B28B 3/02* (2006.01)
*B28B 1/08* (2006.01)
(Continued)

(52) U.S. Cl.
CPC .............. *B28B 3/022* (2013.01); *B28B 1/082* (2013.01); *B28B 1/087* (2013.01); *B29C 33/38* (2013.01); *B29C 67/244* (2013.01); *B30B 11/022* (2013.01); *B30B 15/0076* (2013.01)

(58) Field of Classification Search
CPC .......... B28B 1/082; B28B 1/087; B28B 3/022
See application file for complete search history.

(56) References Cited

U.S. PATENT DOCUMENTS

| 5,248,466 | A | * | 9/1993 | Russell, III | ............... B28B 5/04 264/333 |
| 2007/0244222 | A1 | * | 10/2007 | Ghahary | ............ C04B 20/0076 523/171 |
| 2008/0260883 | A1 | * | 10/2008 | Toncelli | .................. B28B 3/022 425/88 |

FOREIGN PATENT DOCUMENTS

| DE | 2437411 A1 | 2/1976 |
| FR | 2069651 A5 | 9/1971 |

(Continued)

OTHER PUBLICATIONS

EP Extended Search Report for EP12825491 date Nov. 12, 2014.
(Continued)

*Primary Examiner* — James Sanders
(74) *Attorney, Agent, or Firm* — Maine Cernota & Rardin

(57) ABSTRACT

A method of manufacturing engineered stone slabs provides slabs that are equal or superior in appearance and physical properties to slabs manufactured using a conventional Breton press, while weighing less, costing less to manufacture, providing shorter press cycle times, requiring less resin, and consuming less energy. In addition to providing a vibration device above the slab, the press also includes a second vibration device below the slab, which replaces the massive inertial base of a Breton press. The press can be completely enclosed within a vacuum chamber, and vibrationally isolated from surrounding structures. In embodiments, volume reduction blocks reduce the volume to be evacuated. Embodiments use screw jacks and springs or air bags to provide controlled pressing force and precisely uniform slab thickness. Slabs can be inserted and removed on a conveyor belt, or in rigid, self-supporting trays or molds on rollers.

20 Claims, 26 Drawing Sheets

Related U.S. Application Data which is a continuation-in-part of application No. PCT/US2012/051817, filed on Aug. 22, 2012.

(60) Provisional application No. 61/526,308, filed on Aug. 23, 2011, provisional application No. 61/767,272, filed on Feb. 21, 2013.

(51) Int. Cl.
  *B28B 1/087* (2006.01)
  *B29C 33/38* (2006.01)
  *B29C 67/24* (2006.01)
  *B30B 11/02* (2006.01)
  *B30B 15/00* (2006.01)

(56) References Cited

FOREIGN PATENT DOCUMENTS

| | | | |
|---|---|---|---|
| GB | 2098126 | A | 11/1982 |
| GB | 2127343 | A | 4/1984 |
| KR | 20060107614 | | 10/2006 |
| SU | 742130 | A1 | 6/1980 |
| WO | 0043192 | | 7/2000 |
| WO | 2003068468 | A1 | 8/2003 |
| WO | 2005111726 | A2 | 11/2005 |

OTHER PUBLICATIONS

Office Action for CA Patent Application No. 2845865 dated Jun. 1, 2015.
Office Action for CN Patent Application No. 2012-80040810.9 dated Jun. 1, 2015.
Office Action for EP Patent Application No. 12825491.9 dated May 27, 2015.
Office Action for KR Patent Application No. 2014-7007187 dated Aug. 28, 2015.
CN Search Report CN Appl. No. 201280040810.9, dtd Feb. 21, 2014, 3 pages.

* cited by examiner

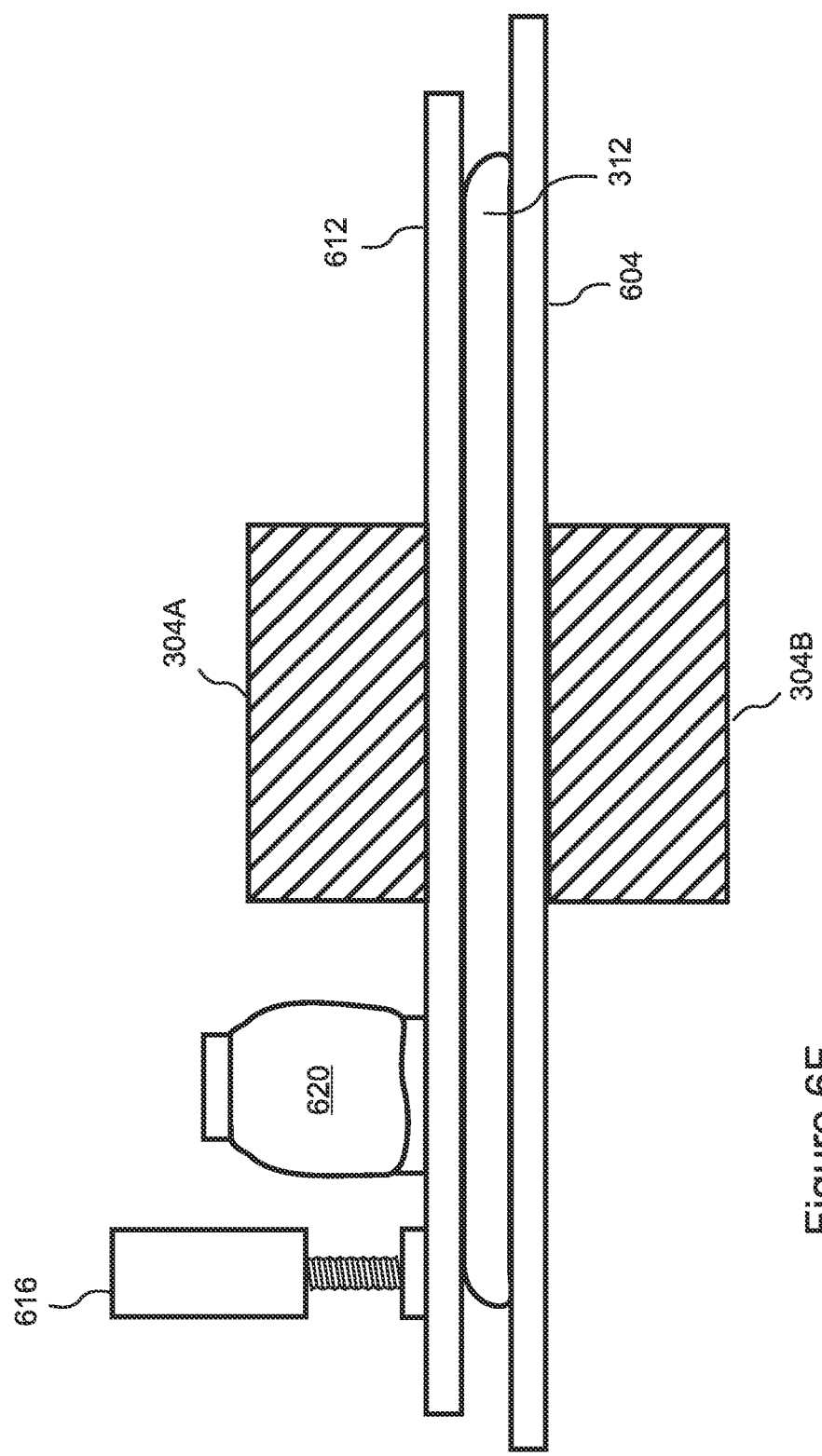

VACUUM VIBRATION PRESS FOR FORMING ENGINEERED COMPOSITE STONE SLABS

RELATED APPLICATIONS

This application is a continuation in part of U.S. application Ser. No. 14/222,695, filed on Mar. 24, 2014. U.S. application Ser. No. 14/222,695 is a continuation in part of U.S. application Ser. No. 13/875,691, filed on May 2, 2013, which is a continuation in part of PCT Application No. PCT/US2012/051817, filed on Aug. 22, 2012, which claims the benefit of U.S. Provisional Application No. 61/526,308, filed Aug. 23, 2011. U.S. application Ser. No. 13/875,691 also claims the benefit of U.S. Provisional Application No. 61/767,272, filed on Feb. 21, 2013. All of these applications are herein incorporated by reference in their entirety for all purposes.

FIELD OF THE INVENTION

The invention relates to engineered stone slabs, also known as Breton stone slabs or Quartz slab, and more particularly, to apparatus for fabricating engineered stone slabs.

BACKGROUND OF THE INVENTION

Engineered stone slabs are a specialized, non-porous, high performance type of composite stone slab that emulates both the physical and visual properties of natural stone slabs. The term "composite stone" is very broad, and can be applied to any material that is formed by adhering stone particles together. The most common forms of composite stone, such as asphalt, normal cement, or polymer cement, are not intended to emulate natural stone, and do not even remotely approximate the physical properties or appearance of natural stone slabs.

Engineered stone slabs, on the other hand, are a very specialized sub-category of composite stone slab which, until the present invention, were fabricated exclusively using a specialized and highly expensive type of vacuum vibration press invented by M. Toncelli of Breton S.p.A, and marketed by Breton since the 1980's. More recently, copies of the Breton design have been manufactured and sold by other sources, but the Breton design remained the only design that could produce engineered stone until the present invention. Accordingly, engineered stone slabs are also sometimes referred to as "Bretonstone slabs." Most commonly, a high percentage of the stone included in an engineered stone slab is quartz. Therefore, engineered stone slabs are also sometimes referred to as "Quartz slabs." Other terms for this highly specialized type of stone slab are "ES-BS" (Engineered Stone-Breton Stone) slabs or "ES-BS-QS" (Engineered Stone-Breton Stone-Quartz Stone) slabs.

With reference to FIG. 1A, the slab mixture 126 used for fabricating ES-BS slabs typically includes about 55-65% stone granules 128, 22-30% −325 mesh stone powder, and between 6% and 10% resin binder, which is a liquid composed of resin, pigment, and additives. In specialized cases, mainly when crystobolite powder is substituted for quartz powder, the percentage of resin can go as high as 12% due to the very high surface roughness of crystobolite particles. This resin binder, combined with the −325 mesh powder, forms a binding paste 130 that binds together the stone granules 128 to form the ES-BS slab. A slab mixture containing more than 15% liquid is not, by definition, an ES-BS slab mixture.

Because of the relatively low percentage of resin binder in engineered stone (typically 6% to 10%), as compared for example to the relatively high amount of water or polymer binder in concrete, there is insufficient binder in an engineered stone slab mixture to fill all of the voids between the stone granules 128 as they are naturally arranged after mixing. As a result, an engineered stone slab mixture initially contains much entrained air 134. And because there is insufficient resin to fill the voids, gentle shaking and vibrating will only cause settling of the mixture, without eliminating the voids between the stone granules, and cannot transform an engineered stone mixture into a void-free article.

Accordingly, it is necessary when fabricating an ES-BS stone slab 132 to force the stone granules 128 in the slab mixture into a "close-packed" configuration, as illustrated in FIG. 1B, wherein the stone granules 128 are migrated under intense pressure and strong vibration from their natural, essentially random distribution, as shown in FIG. 1A, into a space-filling, close-packed arrangement that minimizes the total void volume between the stone granules 128, as is illustrated in FIG. 1B. If this close-packed stone granule configuration is not achieved, there will be insufficient binding paste 130 to completely fill all of the voids between the stone granules 128, and it will therefore be impossible to produce a non-porous slab having properties and appearance similar to natural stone slabs. At best, the result will be a porous slab with very poor qualities and appearance. The close-packed arrangement of the stone granules and the achievement thereby of a non-porous result, when the starting mixture contains too little resin to fill all the voids without close packing, is a defining feature of an engineered stone slab.

Definitons of Terms

Note that the following terms are used with the indicated definitions throughout this paper.

Composite Stone: Composite stone refers to all materials that are made by using some type of binder to glue together any type of stone materials, such as sand, gravel, marble, broken clay pieces, glass, mirror, quartz, or granite. Virtually any naturally occurring mineral or other inorganic material that is hard relative to the intended end use of the composite stone article can be used. There are many types of composite stone, including for example concrete, terrazzo, concrete blocks, concrete or cementitioius pavers and slabs, large concrete slabs as are used for manufacturing buildings or bridge decks, concrete road pavements, polymer concrete slabs and articles, decorative marble-based cementitious or resinous slabs, and finally, engineered stone slabs.

Engineered Stone slabs, also referred to as Bretonstone slabs, Quartz Slabs, (ES-BS) Slabs, or ES-BS-QS slabs. These terms are used synonymously herein to refer to a special class of composite stone slabs that containmore than 85% stone content and less than 15% resinous binder. The slabs are nonporous, having no voids in the interior or on the surface of the slab, and closely emulate the appearance and physical properties of natural stone slabs. Until the present invention, all such slabs were produced using a specialized and costly vacuum vibration press invented about 25 years ago by Breton S.p.A, and procured either from Breton, or more recently from other sources producing copies of the Breton design. The invention of engineered stone and the invention of the Breton press coincided, since the Breton press was designed specifically to produce engineered stone, and until the present invention engineered stone could only be produced using a press of the Breton design.

Stone Granules (SG), also referred to herein as granules or aggregates: This term refers generically to particles of stone (typically quartz or silica based stone), or of other hard materials (such as glass, granite, marble, and such like), having sizes in the range from about 0.2 mm up to 2-3 centimeters.

Quartz Powder (QP), also referred to herein as silica powder and filler: These terms refer to powdered material ranging in particle size from about 1 micron to about 300 microns in diameter. In the industry, QP is typically finely crushed and/or milled quartz or silica sand. It is readily available worldwide in a generally standard minus 325 ("−325") mesh size, and can be made from marble (calcium carbonates), silica, quartz, glass, granite, or any other material that can be powdered and used for making quartz slabs. A special form of Quartz, known as crystobolite (made by heating quartz to over 1000 deg C.) is also used because of its unique whiteness. Due to the high surface roughness of crystobolite particles, and the correspondingly high oil absorption, an additional 1% to 2% resin is typically needed to wet the surfaces of the crystobolite granules, in addition to the 6% to 10% resin needed to fill in the gaps between the granules. Accordingly, for crystobolite-based ES-BS slabs, typically between 8% and 12% total resin is needed.

Resin: This term is used herein to refer to any resin and/or adhesive system capable of adhering together stone granules and quartz powder to form an engineered stone slab. Examples include epoxy, urethane, acrylic, vinyl ester, silicone resins, and even cementitious adhesives based on the various forms of hydraulic type cements. When the resin is a polyester material, then it may include various additives that affect the cure rate, and especially the adhesion of the resin to silica and/or quartz based minerals and granites. In the quartz slab industry, the resin is, for economic reasons, typically a modified polyester thermosetting resin.

Vacuum Vibration Press (VVP): This term is used herein to refer to an apparatus that can simultaneously apply sufficient pressure, vibration, and vacuum to an engineered stone slab mixture to force the stone granules in the mixture into a close-packed relationship that enables the limited amount of resin paste in the mixture to fill all of the remaining voids between the stone granules. It is the achievement of this close-packed configuration that enables the manufacture of an engineered stone slab. Until the present invention, the only type of VVP that was able to apply sufficient vibration and pressure to created close-packing of an ES-BS slab mixture was the Breton style of VVP and copies thereof.

It is important to note that the terms Vacuum Vibration Press, Vacuum Vibrating Press, and VVP as used herein do not apply to all types of press that can simultaneously apply pressure, vibration, and vacuum to a slab mixture. For example, polymer concrete slabs are sometimes manufactured by a press that applies small amounts of pressure, vibration, and vacuum to a PC slab mixture. However, such an apparatus would not meet the definition of a VVP as used herein, because the polymer concrete press would not be able to apply sufficient pressure and vibrational energy to an engineered stone slab mixture to achieve close-packing of the stone granules.

It should be noted that such NC-PC forming devices which include both vacuum vibration and pressing are very rare, because generally the vacuum and pressing functions are unnecessary for settling and flattening NC-PC mixtures. When vacuum vibration and pressing are employed by an NC-PC device, the amounts of vibration and pressing forces these devices apply are a tiny fraction of the forces required for close packing of ES-BS slab mixtures.

Close Packing (CP): This term refers to a tightly packed arrangement of the stone granules in an ES-BS slab mixture, which does not occur naturally, but can only be achieved by the application of strong pressure and vibrations to the mixture (as well as vacuum to remove the entrained air in the mixture). The applied pressure provides the "motivation" for the granules to become close-packed, and the very intense vibration causes the stone granules to move and "jiggle," such that they are able to reorient and move past each other until a close-packed relationship is achieved. Achieving a close-packed arrangement of the stone granules in an ES-BS slab mixture is necessary for the production of ES-BS slabs.

Close Packing Energy (CPE): This term refers to a combination of high pressure and intense vibrational energy that is applied to the stone granules within an ES-BS slab mixture and is sufficient to force the stone granules in an ES-BS mixture to reorient and migrate into a close-packed arrangement. Until the present invention, the only press design that was capable of delivering CPE to an engineered stone slab mixture was the Breton design. Note that CPE is a combination of pressure and vibrational energy, and that different combinations of pressure and vibrational energy can provide CPE. Note also that the vibrational energy included in CPE is the vibrational energy that is present within the slab mixture, which will depend on the efficiency with which external "input" vibrational energy applied to the surface of the slab mixture is transmitted into the interior of the slab mixture.

Settling Energy (SE): this term refers to low to moderate vibration that is sufficient to cause a normal concrete mixture or polymer concrete mixture to settle, and to cause most air entrained in the mixture to rise to the surface, but is not sufficient to apply CPE to an engineered stone mixture. Note that the amount of SE that is required to settle a PC-NC slab mixture is dependent upon the total weight of the slab mixture being processed. Per square foot, the Settling Energy required for NC-PC slabs is only a small percentage of the CPE required for forming ES SLABS SLAB: When this term is used herein in all capital letters, it refers to an engineered stone slab having an area of approximately 44 square feet, and a thickness of between 1 cm and 3 cm. This size of slab is standard in the industry. Older versions of the Breton VVP made slightly smaller slabs, and later models make slightly larger slabs. But, the term SLAB is used herein to refer to the standard 44 square foot, 1-3 cm thick size of engineered stone slab. A 1 cm thick SLAB weighs approximately 230 lbs, a 2 cm thick SLAB weighs approximately 460 lbs, and a 3 cm thick SLAB weighs approximately 700 lbs.

Pressing: This term is used herein to refer to the process of simultaneously applying vacuum, pressure, and vibration to an engineered stone slab mixture in a combination that provides CPE to the ES-BS slab mixture, and thereby forces the stone granules in the mixture into a close-packed arrangement. Until the present invention, the only style of VVP that could accomplish this was the Breton style press and copies thereof.

NC-PC composite stone: This term is used herein to refer generically to composite stone products in which the stone granules are not close-packed. Examples are "normal concrete" and "polymer concrete." In an NC-PC slab mixture, sufficient liquid is provided to fill all the voids between the stone granules as they are naturally arranged when the slab mixture is first prepared. As a result, only very modest vibration, and possibly a small amount of pressure are required to level the mixture and to encourage any entrained air bubbles to rise to the surface and be eliminated.

NC-PC Vibrating Table: This term is used herein to refer to an apparatus that is designed to produce an NC-PC product, and which is not capable of applying CPE to an engineered stone slab mixture, even though it might be able to apply more moderate levels of vibration to an NC or PC slab mixture, possibly with vacuum, and in rare cases also with a small amount of pressure.

FIG. 1C illustrates the basic steps used to manufacture ES-BS slabs according to the Breton method. First, the slab mixture is prepared 100. Typically, this includes preparing a mixture containing about 65% stone granules 102 (small grains of 0.2 mm to 1 mm as well as aggregates pieces from 1 mm to 25 mm) such as crushed quartz, granite, mirror, and/or glass in granule sizes from 0.2 mm up to 6 mm or even 15 mm. About 25% "quartz powder" 104 is also included, where the term "quartz powder" generically refers to one or more powdered minerals such as silica and/or quartz (or crystobolite quartz powder), typically in an approximately minus 325 mesh (minus 45 micron) size. Finally, about 6 to 10% resin 106 is included, typically with additives such as catalyst 108, pigment blends 110, and dispersing media. It is also possible to make the ES-BS slabs with marble or calcium carbonate based powders and granules, although the finished product will have lower scratch/abrasion resistance and lower chemical resistance.

After the raw materials are weighed and measured, they are transported to a mixer 112 and mixed together 114. Typically, the mixer is charged with the stone granules, the resin, pigments, additives, etc are added, and the combination is mixed until the particles and granules are fully wetted. For purposes of color design, two, three, or more mixers may be employed, each with a different color of raw materials and pigments. This is illustrated in FIG. 2.

The quartz powder is then added while the mixing continues. When combined with the resin, the quartz powder forms a binding paste that serves as the binder between the stone granules. The mixed materials are then formed into a single slab 116, either in a rubber mold, a metal mold, or on a sheet of paper or other suitable carrier which can be used to transport the formed slab into the vacuum vibration press (VVP). Note that the order of addition of the various materials can sometimes be changed for efficiency or other reasons.

As illustrated in FIG. 1A, when the engineered stone mixture 126 is mixed and placed in the mold, there is insufficient resin and powder to fill all the voids between the stone granules, and so the mixture contains a significant amount of engrained air 134, and therefore functions as a 2-phase system, where Phase 1 is the grains and aggregate pieces 128, and Phase 2 is the binding paste 130. The mixture is difficult to move, and appears almost dry because of the small percentage of binding paste and the large percentage of stone granules. Entrained air will not and cannot "rise" out of the mixture 126 if only vibration is applied, because the resin and powder binder is so dry and rigid that it traps the air, and also holds the granules in their naturally occurring, "open" (i.e. not close packed) arrangement.

A void-free slab 132 can only be formed from the mixture if the stone granules are compacted into a close-packed configuration (see FIG. 1B), so that the two phases are merged.

Therefore, when the mixed material is spread and leveled in the mold, it is generally 15-50% thicker than the finished slab will be after pressing, because the granules 128 have not been forced yet into a close-packed relationship. For example, for a 2 cm SLAB, the spread and leveled material could be 2.3 to 3 cm thick before the pressing. If this mixture were processed in an NC-PC press, which would not be able to apply CPE to the mixture, the mixture after pressing would still be 10-30% thicker than if CPE had been applied, and would be porous, because the stone granules would be in a normal, non-compacted relationship, and so the mixture would still contain a significant amount of entrained air. Note that there is no existing NC-PC vibrating table or vibrating-press table that is able to apply even a small fraction of the pressure and vibration required to apply CPE to an engineered stone slab mixture.

Once the formed slab mixture 126 has been transferred to the press, it is simultaneously evacuated, vibrated, and pressed 118 in the Breton type VVP so as to compact the mixed material by forcing the granules into a close-packed arrangement 132, thereby minimizing the void volume between the granules 128 so that the small percentage of binding paste 130 is sufficient to fill all remaining space between the granules 128, so that there will be no voids 134 in the finished non-porous slab 132.

Once the slab has been pressed, it is transported to an oven or to some other location for curing 120. Depending upon the adhesive (resin) used to bind the particles together into the slab, the curing and hardening process can take place at ambient temperature or at an elevated temperature, and can require from a few minutes up to many hours. After curing and hardening, the slab is returned to room temperature (if heat has been applied).

The cured slab is then calibrated and polished 122 to a desired thickness and finish, using technology similar to what is used to grind, calibrate, and then polish conventional natural granite stone slabs. The final result 124 is a finished ES-BS slab that is non-porous and closely approximates the appearance and physical properties of natural stone slabs. Note that the presence of a single void on the surface of a slab will render the slab "second quality," and more than two such voids will render the slab unsalable.

Disadvantages of the Breton VVP Design

The Breton vacuum vibrating press (VVP) is effective in producing ES-BS slabs because it delivers a combination of high pressing force and very high vibration energy that is sufficient to apply CPE to an engineered stone slab mixture, thereby forcing the stone granules into a close-packed arrangement. However, there are several disadvantages associated with the Breton style of VVP and procedure.

First, a Breton-style press 300 employs massive weight and power to simultaneously apply a vacuum, vibration, and downward pressure to the formed slab 312. Breton presses are therefore difficult to site and expensive to operate. With reference to FIG. 3A, the Breton press 300 includes a press cover/vacuum chamber 302 which is also the housing for vibrating motor 304 mounted to a vibration plate 306 and suspended by air bags 308 or similar vibration mounts. The press cover 302 is mounted on pneumatic posts 310 so that it can be lowered onto a formed slab material 312 which is typically brought into the press on a conveyer belt 314 running between the press cover and a press base 316. The steel vacuum chamber/press cover (302), which is typically shaped as a rectangular box, is massively built to withstand the vacuum force and the destructive long term effects of the intense vibration.

As seen in FIG. 3A, the press cover 302, which also contains the pressing mechanism and the vibrating press plate, is moved up and down with the hydraulic pistons 310. Because the downward pressure on the press plate during the vibration pressing cycle is up to 40 psi, then the hydraulic cylinders are required to hold the entire vacuum cover down, so as not to be pushed up (despite the 15 psi internal vacuum). As a result, the press cover 302 and included mechanisms 304, 306, 308 weigh between 10,000 and 15,000 pounds. In addition, the press base 316 weighs about 30,000 pounds. Altogether, the Breton press 300 typically weighs from 50,000 to 75,000 pounds.

In addition, a Breton press 300 must be anchored to a vibration-damped block 318 of concrete that is set beneath the concrete floor 320 and surrounded by a vibration isolating material 322. The vibration-damped block 318 is approximately 20' long by 15' wide by 20' deep, and weighs another 300 tons. The press 300 plus the concrete block 318 "foundation" to which the press is anchored, form an "inertial base" weighing more than 325 tons, whose purpose is to force some of the applied vibration energy into the slab material, so that close packing can be achieved.

Without this enormous concrete block 318 and press base 316, close packing of the stone granules 128 would not result, because the applied vibrational energy would just pass through the SLAB, which only weighs 250-800 lbs, and would simply shake the base. Nevertheless, a Breton-style press has a very low energy efficiency. Even with the 325+ ton base as an inertial mass that resists the rapid vibration movement of the press plate 306, only a small percentage of the vibrational energy goes into the slab material 312 to accomplish the required close packing. This is partly because the massive base is only inertial, and is not actually a good "reflector" of vibrational energy back into the slab.

In addition, the more or less stationary inertial base also restricts and resists the movement and "jiggling" of grains and aggregate pieces in the slab, especially those grains and aggregate pieces that are near the bottom of the slab and close to the more or less immoveable inertial base.

Both of these problems must be overcome by applying a very high vibrational energy and pressure to the system. Because the formed slab 312 is positioned on a solid base 316 that is bolted to a concrete block 318, together weighing more than 325 tons, an enormous vibration force (about 90 KW per 45 sq foot SLAB or 2 kw per sq ft at 1000 to 5000 rpm) must be applied by a Breton-style press simultaneously with a static downward pressure on the vibrating press plate of 20-50 PSI, so as to properly vibrate and compress the SLAB. Essentially, to press and vibrate a quartz slab 312 weighing 250-700 pounds, the Breton press 300 is required to vibrate a mechanism 302, 316 weighing 50,000 to 75,000 pounds, plus the 300+ ton concrete block 318 it is bolted to. And still, only a modest amount of the applied vibrational energy is delivered into the slab to effect the close packing.

Also, there are incentives to apply more than just the minimum vibrational energy required to close-pack the slab. It is well known by ES-BS manufacturers, that when you apply more vibrational energy to a slab as it is pressed, then you can significantly reduce the amount of resin that is required, thereby saving cost (resin is expensive) and producing a slab more quickly and with even better appearance and physical properties. This can drive the energy costs still higher.

In addition, a Breton-style press imparts significant vibrations to the ground and surrounding structures. The entire Breton device, weighing more than 325 tons, is surrounded by foam vibration isolation walls 322, which isolate some of the vibration from the rest of the building. But in actual fact, the vibration from the device can be felt in the floor of the building from between 20 and 100 yards away.

Also, Breton-style presses are slow. The vacuum vibration cycle time per slab for a Breton press 300 is about 70-280 seconds, which reduces production throughput, and raises the operating cost. Also, a Breton-style press 300 costs about $6 to $7 million US dollars, which is very expensive.

Comparison Between PC-NC Slabs and Bretonstone Slabs

So as to fully understand the present invention and how it is distinguished from the prior art, it is important to understand the distinctions between engineered stone slabs and other types of composite stone products and the devices that are designed to make them, referred to herein generically as PC-NC products and vibration tables. The vast majority of composite stone materials, mainly concrete and polymer concrete, are produced for structural and/or industrial purposes, while engineered stone is produced mainly for decorative purposes. There have been a few attempts during the last 30 years to produce a decorative non-Bretonstone composite stone product, but they have been mainly unsuccessful. These include PBI, which failed in the decorative market; Granitech, which also failed in the decorative market; GRANIT 90, which is still produced but in very small quantities, and RESPECTASTONE, which is currently not in the market because of its high resin content and unsatisfactory appearance and physical performance as compared to Bretonstone.

Because the purpose, design, and effect of the ES-BS and of the PC-NC devices and products produced are so different, expertise in one area does not translate easily into expertise in the other area. Experts in the field of Polymer Concrete and Normal Concrete (PC-NC) and experts in the field of Engineered Stone do not normally discuss the distinction between these materials and their very different energy-principals of compaction, simply because the produced products are in entirely different categories as to use and manufacturing principals. Nevertheless, there are very important distinctions that must be understood in order to understand the present invention.

Normal concrete and cement type mixtures have a high liquid content, and are generally liquid, flowing, and easy to move. Air bubbles entrained in the mixture are often not a problem, because they tend to rise out of the mixture due to the high liquid content. Relatively low energy vibration, applied to the outside of the container or by placing the vibrator head into the mixture, is sufficient to remove the entrained air and settle the mixture into the desired shape.

Polymer concrete: These mixtures have a lower liquid content than normal concrete, because polymer is expensive, but the liquid content is still much more than for an engineered stone mixture, and is adequate to wet all the grains and pieces of aggregate in the PC mixture. A PC mixture normally flows easily, and can typically be leveled and formed by the application of very modest vibration, although vacuum degassing may be used to remove the entrained air, and in rare cases a mild pressure may be applied, typically when the PC slab must be pressed onto a form to create a non-flat shape.

With reference to FIG. 3B, in a normal concrete or polymer concrete mixture 324, after mixing, the stone granules 128 and smaller grains 326 are completely surrounded by a surplus of liquid 328, which is typically water, Portland cement slurry, or polymer. The mixture 324 is a single phase system, in that it is a liquid or semi-liquid "soup" containing more or less freely moving grains 326 and aggregate pieces 128.

Because there is sufficient liquid plus fine grains or powder to fill all the space between the grains 326 and aggregate pieces 128, an applied vacuum, or vacuum with moderate vibration, will cause any entrained air to rise to the surface and be removed, and will typically cause the mixture to flow into a mold, although sometimes gentle pressing is also applied, especially when forming non flat items. This combination of moderate vibration and pressure is referred to herein as "settling energy" or "SE."

A typical SE vibrational energy would be in the range of 1-5 HP per PC SLAB. This vibrational energy can be delivered by any number of NC-PC vibrating machines manufactured by hundreds of companies. Application of additional strong pressing and vibration to a normal concrete or polymer concrete mixture, for example at a level equivalent to CPE, would not further compact the mixture, because the mixture does not include any voids that can be filled or any other mechanism that would allow for further volume reduction. To the extent that the larger aggregates pieces 128 are moved closer together by SE, normally to the bottom of the mold, because their density is higher than the polymer-powder or water/cement binder, this process is similar to vibration-assisted sedimentation, and does not result in any special close packing of the settled pieces, or any reduction in volume.

In contrast, in manufacturing an ES-BS SLAB, the Bretonstone type of VVP applies CPE that includes an input vibration energy of more than 100 HP per SLAB.

There is also a very large difference in the pressure that is applied by a PC-NC press as compared to an ES-BS press. Typically, for a PC-NC press the pressing is solely for the purpose of flattening the PC-NC slab mixture, or to press a form down into the material in order to create a 3-d shape such as a trough or basin. As discussed above, because a PC-NC slab mixture contains enough liquid and powder to fill all of the voids between the grains and aggregates, the mixture is not compressible in volume. Hence only a very modest pressure needs to be applied by the platen or mold. Typically, a PC-NC press need only apply one or two psi to the slab mixture to accomplish the desired result.

In contrast, forcing the stone granules of an engineered stone mixture into a close-packed relationship requires an ES-BS Breton-style press to apply very high pressure to the slab mixture at the same time as the intense vibrations (and of course the applied vacuum). Typically, a Breton ES-BS press must apply between 20 and 50 psi.

There is also a significantly different relationship between slab size and required vibrational energy for PC-NC slabs as compared to ES-BS slabs. In the case of PC-NC materials, if the article to be vibrated is of lower weight, then proportionally less vibrational energy is required. However, this is not true for ES-BS slabs. The same very intense vibrational energy that is required for a 700 lb 3 cm thick SLAB is also required for a 250 lb 1 cm thick SLAB. Why? Because in the case of ES-BS materials, only a very small percentage of the vibrational energy (and pressing) is used as SE energy to flatten or mold the mixture, while most of the vibrational energy is applied as CPE energy to force the close packing of the grains and aggregates pieces, irrespective of the slab's weight.

PC-NC devices and ES-BS VVP presses also differ typically in the number of vibration devices that are used. For Breton-style ES-BS presses, most manufacturers use a single vibration device on the top plate. However it is possible to place 2 or more vibrating devices on the top press plate, provided that they are mechanically or otherwise "linked" to function as a single unit of force in amplitude and frequency, and are required to have uniform vibration energy and waves across the entire slab. Due to the large concrete base beneath the press table, it is not possible to attach vibrating devices to the bottom of the press table. In contrast, PC-NC presses may include one or two synchronized vibration devices on the bottom of the slab tray in addition to one or more vibration devices on the sides of the slab tray to facilitate movement of the slab mixture, especially into complex shapes or molds, especially for large bridge decks or wall sections of reinforced concrete. But the use of said multiple vibration devices does not radically change the principals of the function and design of a PC-NC press.

What is needed, therefore, is a system for manufacturing engineered stone slabs that is much lower in weight, requires much less input vibrational energy, transmits much less vibration to surrounding structures, delivers more vibrational energy to the slab mixture, requires less resin, is faster, and costs significantly less to purchase, site, and operate than a Breton-style VVP.

SUMMARY OF THE INVENTION

A vacuum vibration press for making engineered stone slabs and other engineered stone products applies as much or more CPE energy to a formed ES-BS mixture as a conventional Breton press, while weighing less, costing less to manufacture, providing shorter press cycle times, requiring less resin in the slab recipe, and requiring less energy consumption to vibrate the slab as compared to a Breton press.

It is estimated that the press of the present invention can be manufactured at a cost of approximately $1,000,000 US dollars. These advantages are realized by replacing the entire 350+ ton inertial base of the Breton design with a lightweight plate and a vibrating device below the plate. By applying vibrations to an ES-BS slab mixture from both above and below the slab, a high percentage of the vibrational energy is directed into the slab, so that much less vibrational energy is needed, less resin is required, and the press cycle time is shorter than for a Breton press. And because the massive base of the Breton press is eliminated, the weight is much less, and the cost and siting difficulties are much less than for a Breton press. In addition, almost no vibration is imparted to surrounding structures. This is because of the reduced vibrational energy, and also because the reduced weight allows use of nearly 100% effective vibration isolation.

In embodiments, instead of a rectangular vacuum chamber with enormous strength and weight, the press of the present invention includes a lightweight, cylindrical vacuum chamber inside of which the vibration mechanisms, press plate, and slab support are suspended. Accordingly, in contrast to the traditional Breton press, the vacuum chamber of the present invention is not vibrated, but is isolated from all vibration. This approach makes it feasible to use any type of design and/or construction for the vacuum chamber, including lightweight cylindrical designs, and also rectangular and massive designs if so desired. Whereas only about 5% of the machinery of the Breton device (the slab, the surface of the inertial base and the vibrating plate mechanism) is enclosed within the vacuum chamber, in embodiments of the present invention 100% of the pressing and vibration mechanism is enclosed in a vacuum chamber.

Instead of vibrating a 50,000 pound vacuum vibration press and its 300+ ton inertial base concrete block (requiring input of 90 kw per 45 sq. ft. SLAB), the press of the present invention is only required to vibrate about 3000 to 5000 pounds of machinery and SLAB, which requires input of only about 25 HP per 45 sq. ft. SLAB.

The portion of the press that is vibrated is referred to herein as the Vibration and Pressing Mechanism (VPM). The VPM is simple and light, comprising a Vibration Press Table Support Frame, or VPT-SF, which is also a vibrating press plate, a vibration table, a press plate and pressing mechanism, and at least one Vibration Device (VD) on each of the top and bottom vibrating press plates.

In various embodiments, the Vibration Press Table Support Frame (VPT-SF) is supported by vibration dampers that are fixed to the inside of the vacuum chamber. The vibration table is connected to and raised up from the support frame by air springs, air bags, or another suitable mechanism which allows the vibration table to move freely without transmitting vibration to the vacuum chamber. In embodiments, the top press plate and pressing mechanism are supported above the formed slab, and are lowered, positioned precisely, and vibrated so as to accomplish the required compaction of the slab material components. In essence, the present invention replaces the 350 ton inertial base of the Breton press design with a second vibrating press plate and vibration device below and in direct opposition to the upper press plate and upper vibration device. In embodiments, 2 or more vibration devices are included on either the top press plate and/or the bottom press plate. In embodiments where multiple vibrating devices are used on the same press plate, they are synchronized either mechanically, electronically or otherwise so that they act as a single vibrating device.

In various embodiments, the top and bottom vibrating devices can be operated at different frequencies, for example the top vibrating devices can operate at a frequency that is between 40% and 80% of the frequency of the bottom vibrating devices, or vice-versa. Of course, when the vibration devices are operated at different frequencies, then the applied vibrations drift into and out of phase at a rate that depends on the frequency difference between the devices. Embodiments are able to operate the vibration devices with various relationships of phase and/or frequency between the top and bottom devices.

Tests on prototypes of the present invention have shown that when only one of the top and bottom vibrating devices was operated during the pressing process, then the resulting product was not pressed well, lacking the required close packing of the stone granules and with much porosity and entrained air. The reason is that when vibration energy is applied to only the top or bottom of the slab, the vibration energy passes through the slab and moves the whole VP device, rather than forcing the vibrational energy into the slab. This is why the Breton design includes a huge inertial base.

One general aspect of the present invention is a method of manufacturing an engineered stone product. The method includes mixing stone granules and stone powder with a resin binder to form an engineered stone mixture containing no more than 15% resin binder by weight, pouring the engineered stone mixture onto a horizontal mixture support, locating and supporting the horizontal mixture support on a vibration table within a vacuum chamber, bringing a pressing mechanism located within the vacuum chamber into contact with a top of the engineered stone mixture, the engineered stone mixture being thereby sandwiched between the vibration table and the pressing mechanism, creating a vacuum within the vacuum chamber, applying pressure to compress the engineered stone mixture between the pressing mechanism and the vibration table, while simultaneously applying vibrational energy to the pressing mechanism from above and to the vibration table from below. The vibrational energy is thereby transmitted into the engineered stone mixture, continuing to apply said pressure and said vibrational energy within said vacuum until all remaining spaces between said stone granules and stone powder are filled by the resin binder, and all voids within the engineered stone mixture are eliminated; and allowing the engineered stone mixture to cure and harden into an engineered stone product.

In embodiments, the engineered stone product is an engineered stone slab having an area between 43 square feet and 60 square feet, and a thickness between 5 mm and 50 mm.

Regarding any of the embodiments mentioned above, in some of these embodiments a total of no more than 0.6 kW per square foot of combined vibrational energy is applied to the pressing mechanism from above, and a total of no more than 0.6 kW per square foot of combined vibrational energy is applied to the vibration table from below Regarding any of the embodiments mentioned above, in some of these embodiments no more than 10 psi of pressure is applied to the engineered stone mixture.

In any of the embodiments mentioned above, the vibrational energy applied to the pressing mechanism can differ in frequency from the vibrational energy applied to the vibration table.

In any of the embodiments mentioned above, applying vibrational energy can include applying at least one of mechanical and ultrasonic vibrational energy.

In any of the embodiments mentioned above, supporting the horizontal mixture support within the vacuum chamber can include inhibiting transmission of vibrational energy from the horizontal mixture support to the vacuum chamber by supporting the horizontal mixture support using a support mechanism that includes at least one of a spring, an elastomer, and an air cushion.

Regarding any of the embodiments mentioned above, some of these embodiments further include using a transport mechanism to transport the slab mixture into and out of the vacuum chamber.

In any of the embodiments mentioned above, the transport mechanism can include a conveyor belt.

In any of the embodiments mentioned above, the horizontal mixture support can be rigid and self-supporting. In some of these embodiments the horizontal mixture support is a tray or mold, and/or rollers are used to transport the slab mixture into and out of the vacuum chamber.

Regarding any of the embodiments mentioned above, some of these embodiments further include at least one vacuum volume reduction block within the vacuum chamber, the vacuum volume reduction block being configured to fill space within the vacuum chamber so as to reduce an evacuation volume that is subject to evacuation within the vacuum chamber.

Regarding any of the embodiments mentioned above, some of these embodiments further include using at least one space-adjusting mechanism to adjust a spacing between the pressing mechanism and the top of the engineered stone mixture in the horizontal mixture support, so as to produce an engineered stone product having a uniform thickness.

And in some of these embodiments the space-adjusting mechanism includes a screw jack.

Regarding any of the embodiments mentioned above, in some of these embodiments the pressing mechanism includes at least one of an air bag, an air cylinder, and a spring.

Regarding any of the embodiments mentioned above, in some of these embodiments the vibrational energy applied from above to the pressing mechanism differs in amplitude from the vibrational energy applied from below to the vibration table.

Regarding any of the embodiments mentioned above, in some of these embodiments the vibrational energy is applied from above to the pressing mechanism and from below to the vibration table by a plurality of vibration devices, said vibration devices including at least one upper vibration device in mechanical communication with the pressing mechanism and at least one lower vibration device in mechanical communication with the vibration table. And in some of these embodiments the plurality of vibration devices includes at least one of a plurality of upper vibration devices and a plurality of lower vibration devices.

Another general aspect of the present invention is a lightweight, energy efficient, low cost vacuum vibration press for forming an engineered stone product by simultaneously compressing and vibrating under vacuum an engineered stone mixture. The press includes a vacuum chamber, a vibration table configured to support the engineered stone mixture, said vibration table being located within the vacuum chamber, a pressing mechanism configured to compress the engineered stone mixture between the pressing mechanism and the vibration table, said pressing mechanism being located within the vacuum chamber, a first vibration device attached to a bottom of the vibration table, and a second vibration device attached to a top of the pressing mechanism. The pressing mechanism and the vibration devices are configured to apply compressional and vibrational forces to the slab mixture that are sufficient to force the stone granules in a slab mixture having at least 85% stone granules and stone powder, and no more than 15% resin into a configuration in which the resin and stone powder fill substantially all voids between the stone granules.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 6F is a close-up cross-sectional view of a screw jack and air bag supporting a press plate in an embodiment similar to the embodiment of FIG. 6A;

DETAILED DESCRIPTION

A vacuum vibration press for making engineered stone slabs applies as much or more CPE energy to a formed ES-BS slab mixture as a conventional Breton press, and produces ES-BS slabs having appearance and physical properties that are equal to or superior to slabs produced using a Breton-style press. The present invention also weighs significantly less than a Breton-style press, and costs less to manufacture . A Breton press costs approximately 7 million US dollars to produce and install, as compared to embodiments of the present invention with similar capacity of slab size and throughput that are expected to cost about 1.5 million US dollars to produce and install.

The present invention also provides shorter press cycle times. And because of the increased vibrational and grain "jiggling" power of the present invention, it is possible to reduce the resin % significantly in the slab recipe. On average, a 2.5 cm thick 45 sq ft slab produced using a Breton-style press requires about USD $90 of resin. The average Breton-style press can produce 100,000 slabs per year. In contrast, embodiments of the present invention, because of its increased vibrational energy efficiency, can reduce the required amount of resin up to 8%, or about $7.20 per slab. That translates into a yearly savings of $700,000+ per year in resin costs, while also requiring less energy consumption to vibrate the slab as compared to a Breton press.

Figure 1B:
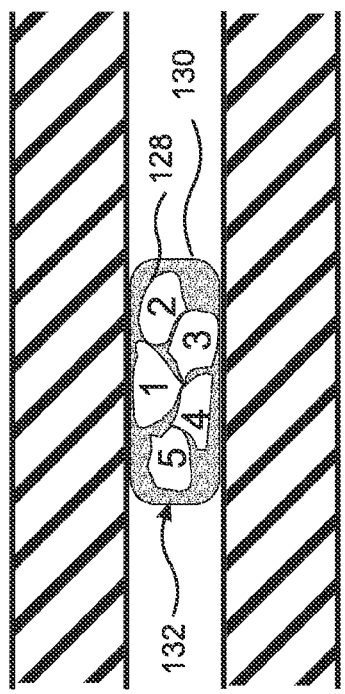
FIG. 1B is a cross-sectional illustration of the composite stone mixture of FIG. 1A after close-packing, showing the resin and powder filling all the entire space between the stone granules, with no voids.
Figure 1A:
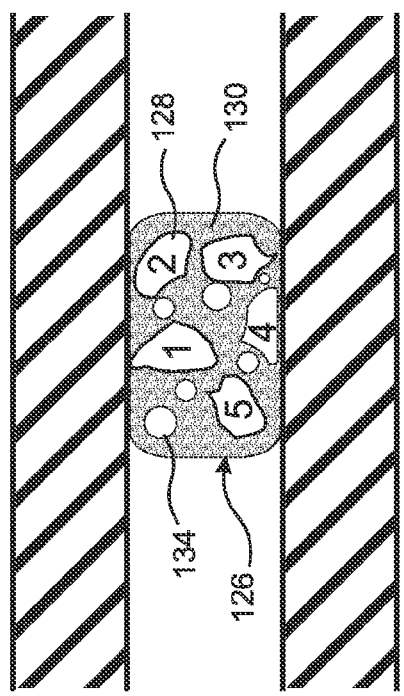
FIG. 1A is a cross-sectional illustration of stone granules, resin, and voids in an engineered stone mixture before close-packing.
Figure 1C:
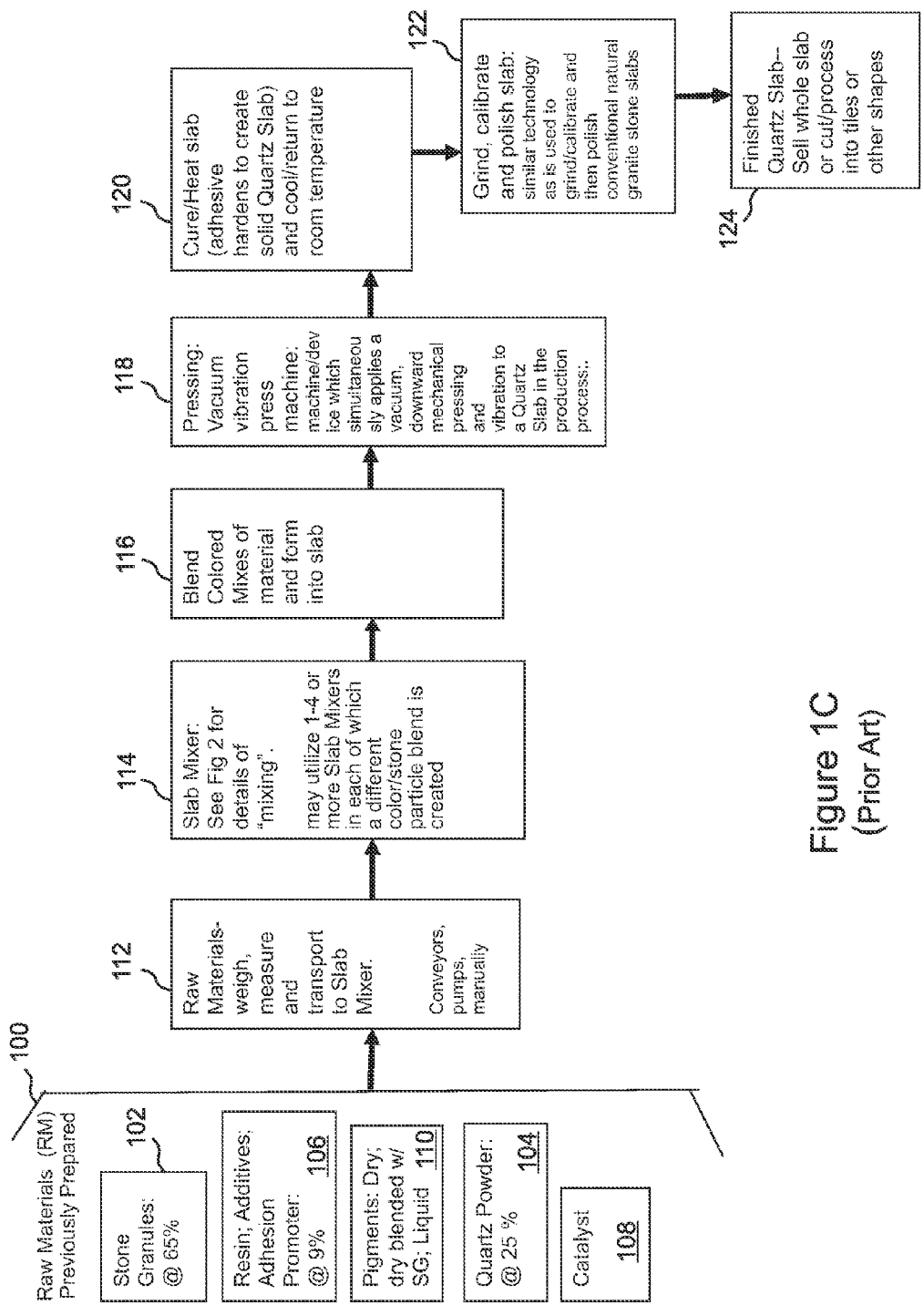
FIG. 1C is a flow diagram illustrating the overall production process for making composite stone slabs according to the traditional Breton process of the prior art.
Figure 2:
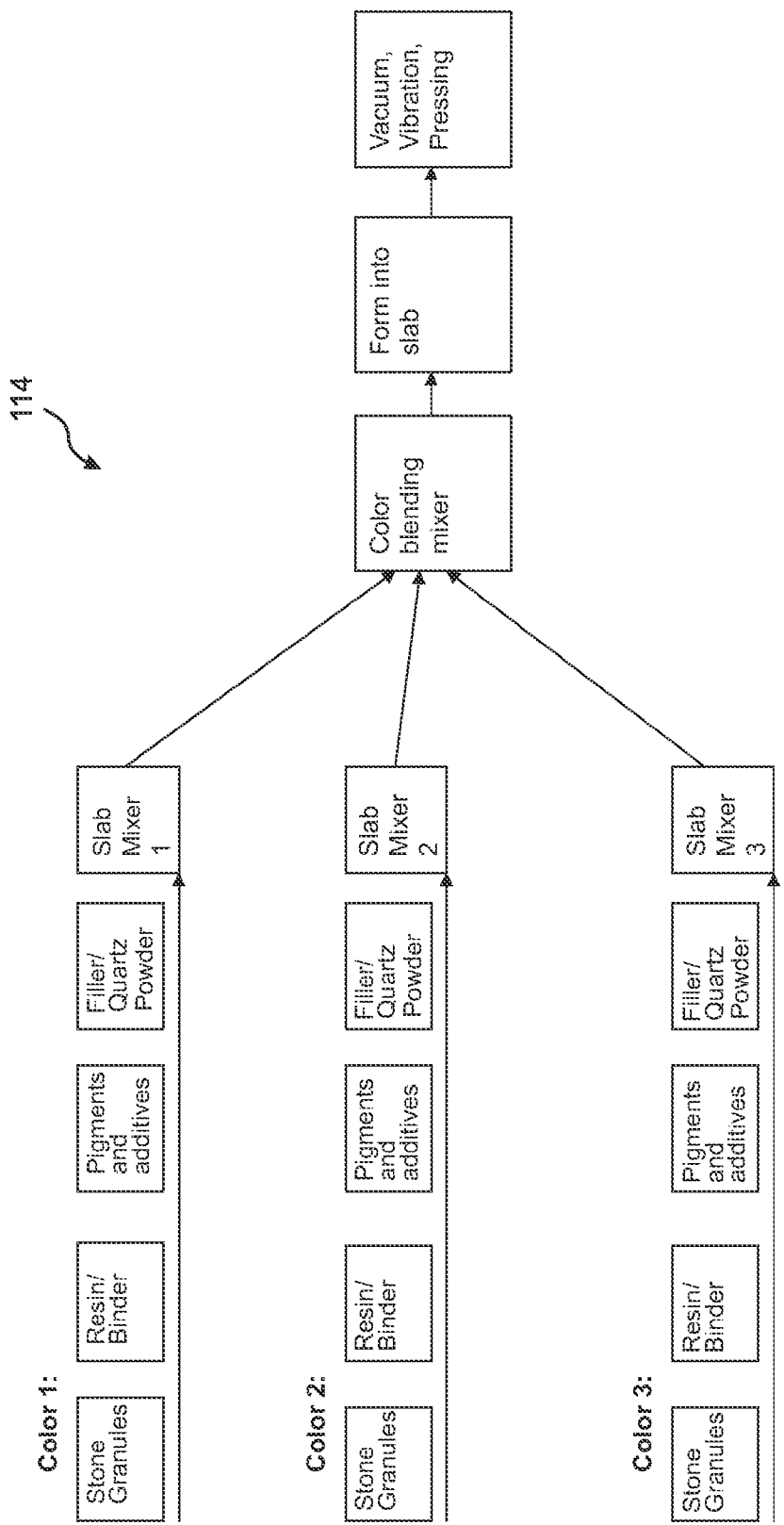
FIG. 2 is a flow diagram illustrating the mixing and combining of a plurality of powder, stone particles, and other components having different colors and/or other differing properties, according to the traditional Breton process of the prior art.
Figure 3A:
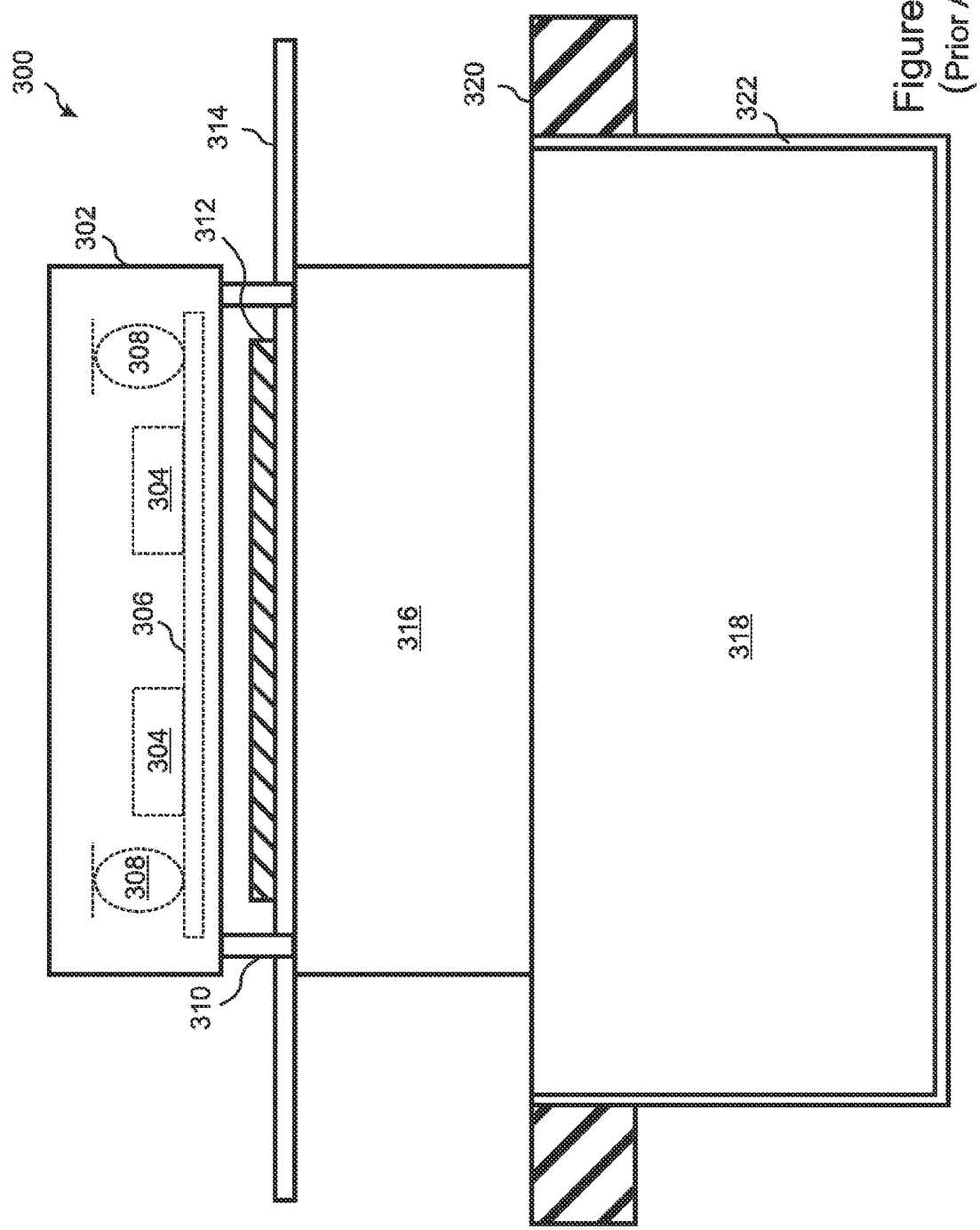
FIG. 3A is a cross-sectional illustration of a traditional Breton press of the prior art.
Figure 3B:
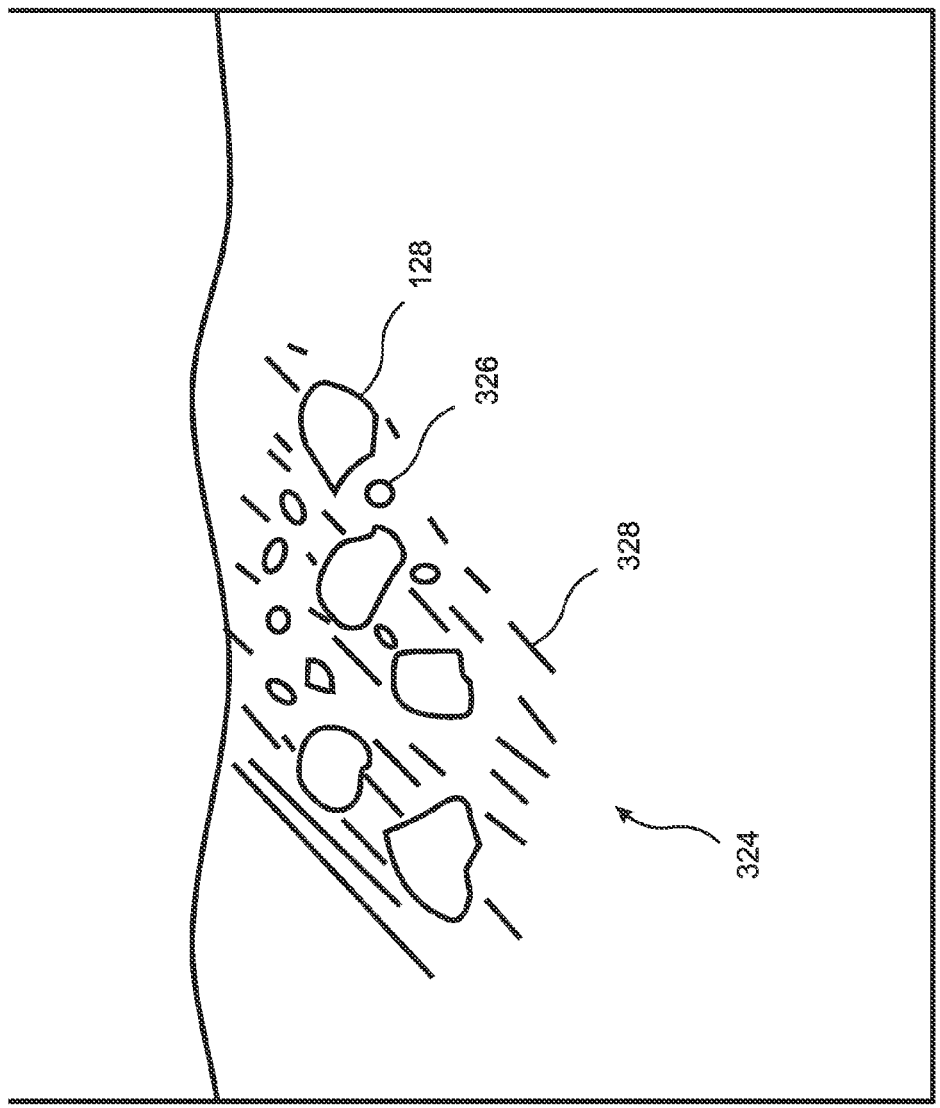
FIG. 3B is a cross-sectional illustration of a typical PC_NC slab mixture of the prior art, showing the excess of liquid and powder completely filling the spaces between the randomly oriented stone granules.
Figure 3C:
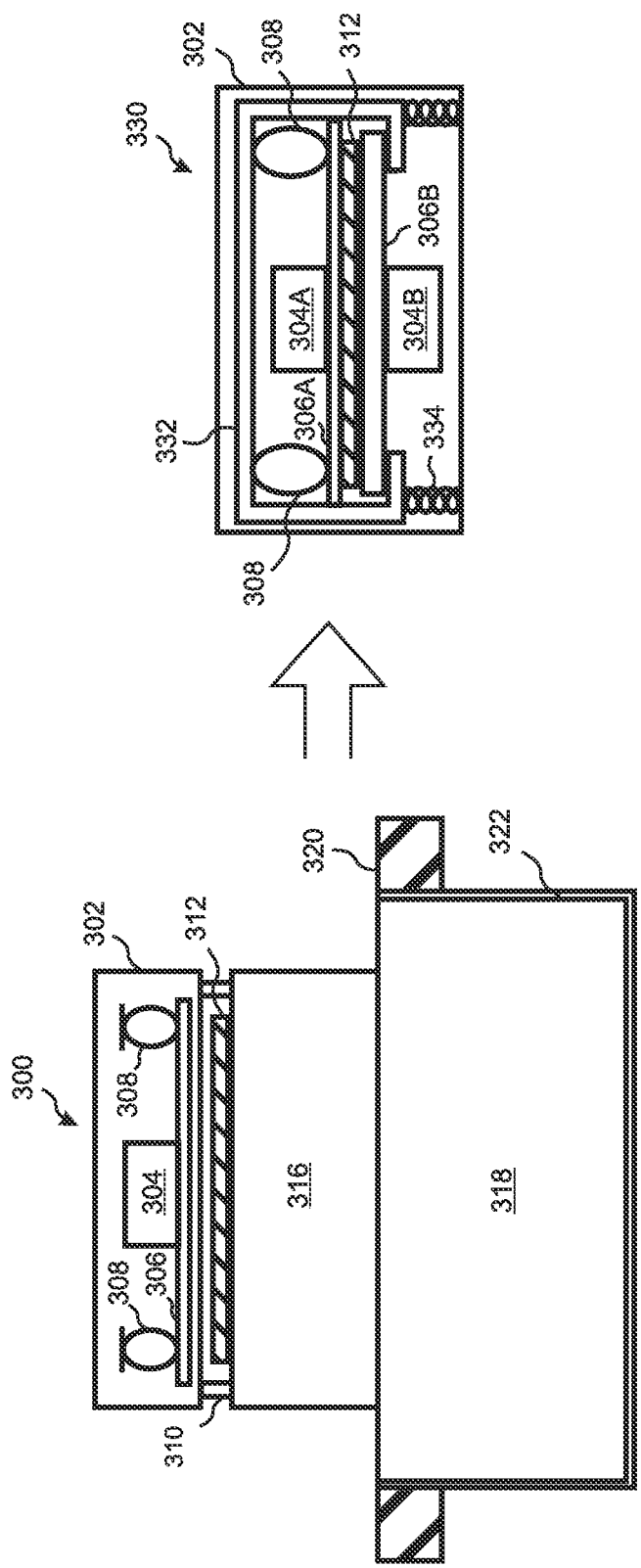
FIG. 3C is a comparison of cross sections of a prior art Breton press and a press embodiment of the present invention, where the comparison illustrates that the present invention replaces the 350 ton inertial base of the Breton design with a lightweight vibrating press plate.

As is illustrated in FIG. 3C, these advantages are realized in the present invention 330 by replacing the entire 350+ ton inertial base 316, 318 of the Breton design 300 with a lightweight plate 306B and a second vibrating device 304B below the plate, in addition to the plate 306A and vibration device 304A above the pressing mechanism 306, and a mounting bracket 332. This allows the pressing 306A, 306B and vibrating 304A, 304B mechanisms to be contained within the vacuum chamber 302, so that there is no need for a massively reinforced vacuum chamber 302, no need for a 300+ ton inertial base, and no need to vibrate the vacuum chamber 302 together with the formed slab 312. By applying vibrations to an ES-BS slab mixture 312 from both above and below the slab, a high percentage of the vibrational energy is directed into the slab, so that much less vibrational energy is needed, less resin is required, and the press cycle time is shorter than for a Breton press 300. And because the massive base 316, 318 of the Breton press is eliminated, the weight is much less, and the cost and siting difficulties are much less than for a Breton press 300. In addition, virtually no vibration is imparted to surrounding structures. This is because of the reduced input vibrational energy, the near 100% efficiency of vibrational energy transfer into the slab (rather than in to the device and surrounding), and also because the reduced weight allows virtually 100% efficient vibration isolation 334 to be used.

Figure 3D:
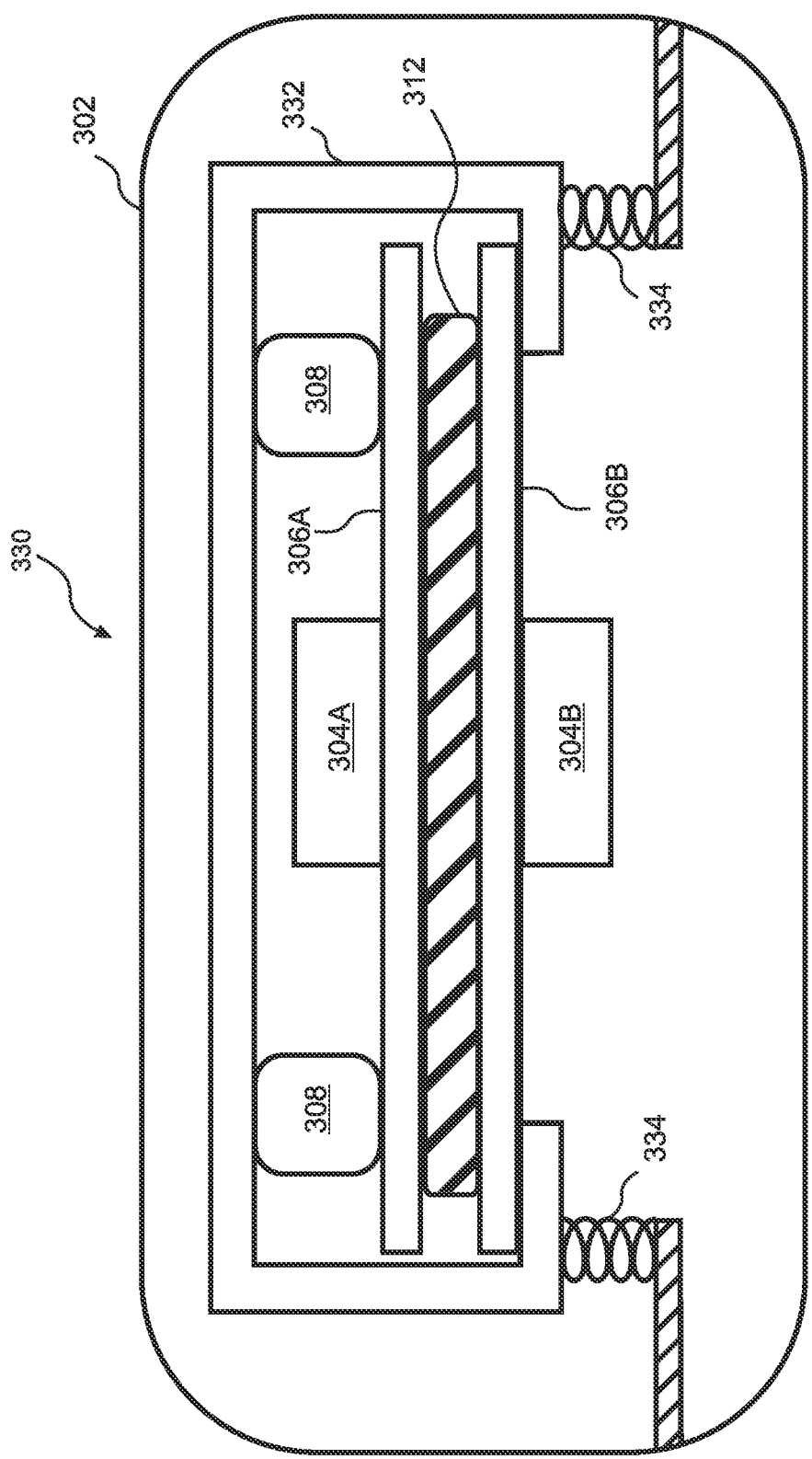
FIG. 3D is a simplified cross-sectional illustration showing primary components of an embodiment of the present invention, including suspension of the press and vibration mechanism within a vacuum chamber.

An enlarged cross-sectional illustration of an embodiment of the present invention is illustrated in FIG. 3D. In the embodiment of FIG. 3D, the entire device 330 weighs approximately 10,000 lbs, requires no special foundation, and causes very little vibration outside of the vacuum chamber 302. Virtually all of the vibrational energy is transmitted into the slab 312 being pressed. Because of the present invention's increased efficiency of transferring vibrational energy into the slab mixture, the vibrational energy applied by the device 330 is reduced from 2 kw per square foot of SLAB for a Breton-style press to only 0.6 kw per sq foot of SLAB in embodiments of the present invention.

To understand how the present invention provides these benefits, it is useful to note the following points:

The rate of compaction and the amount of resin required by an engineered stone press does not depend on the amount of energy that is consumed by the apparatus to generate vibrations, but rather on how much vibrational energy is actually applied as close-packing action inside the slab mixture. A typical Breton press applies 2 kw/sq ft, but due to energy transmission inefficiencies only a small fraction of this energy is effective inside the slab. In contrast, embodiments of the present invention consume only about 0.6 kw/sq ft, but actually transfer much more vibrational energy to the slab mixture because the energy transfer efficiency is nearly 100%.

It is not what happens overall during the pressing time, which is typically 75 seconds for a Breton-style press and about 60 seconds or less for embodiments of the present invention, that matters, but rather what is happening inside the slab during that time on a microscopic level and on a time scale of 1 millisecond or less, because the actual incremental movements of the grains and aggregates pieces in the slab mixture is taking place at the frequency of the applied vibration. The present invention provides significantly improved performance on that microscopic level, as compared to Breton-style presses.

Because the close-packing process takes place on a millisecond time scale, and the movements of the stone granules are over distances of from about one to about 200 microns, it is not necessary to have a base weighing 350 tons. By replacing the 350 ton base of the Breton design with a second, relatively lightweight vibrating press plate below the slab, it is possible to manipulate the "shape" of the vibrational energy being applied to the slab, and to manipulate this vibrational "shape" on a microscopic distance and time scale for more effective granule "jiggling" and close packing function.

By replacing the 350 ton base with a bottom vibrating plate, and then suspending the entire device on a vibration isolation mechanism such as springs or airbags inside a vacuum chamber, nearly all of the vibration energy applied is actually delivered into the slab.

Figure 3F:
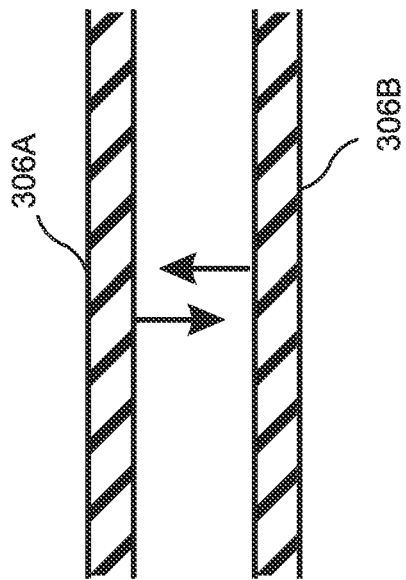
FIG. 3F is a cross-sectional illustration showing vibration applied from both above and below by a press of the present invention, providing higher instantaneous compaction pressure as compared to the Breton press of FIG. 3E.
Figure 3E:
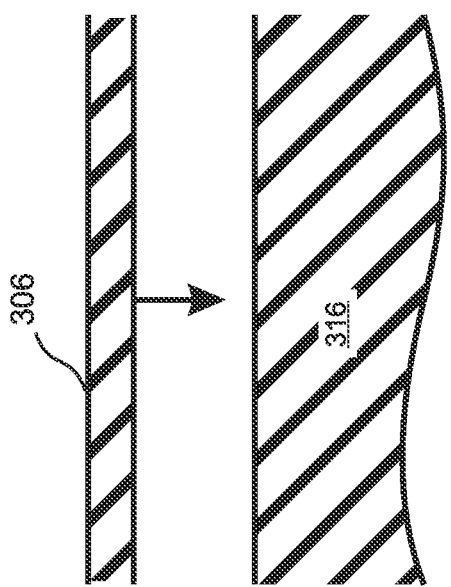
FIG. 3E is a cross-sectional illustration showing vibration applied only from above in a Breton press of the prior art.

With reference to FIGS. 3E and 3F, the difference in energy efficiency between applying vibrational energy only from above (FIG. 3E), vs. applying vibrational energy both from below and from above (FIG. 3F) is significant. The present invention (FIG. 3F) delivers more vibrational "jiggling" energy to the grains and aggregate pieces in the slab mixture to facilitate close packing Unlike a Breton-style press, where much of the vibrational energy escapes from the device into the surroundings, almost no vibrational energy escapes the pressing mechanism in the present invnetion, so that nearly all of that vibrational energy is forced into the slab, and therefore the instantaneous pressing pressure is much higher than in a Breton press, contributing further to the enhanced performance of the present invention.

Figure 3H:
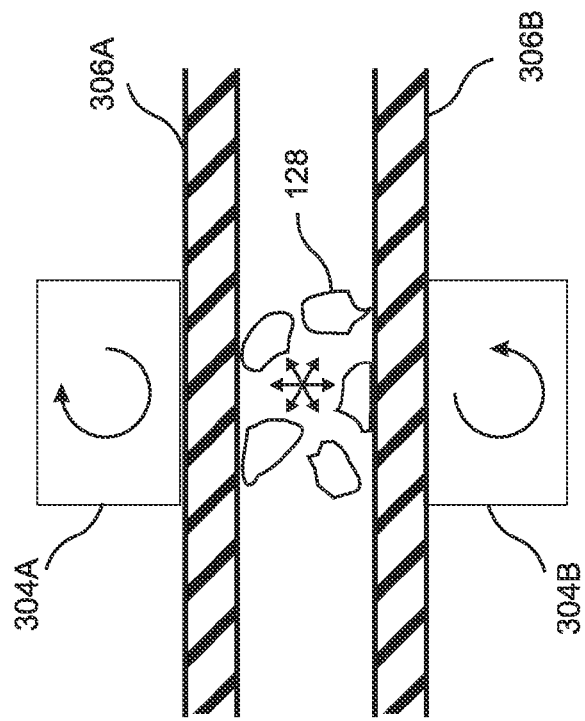
FIG. 3H is a simplified cross-sectional view of an embodiment of the present invention illustrating the opposed rotary vibration of the upper and lower vibrating devices, and the resultant complex movements of the stone granules in the slab mixture.
Figure 3G:
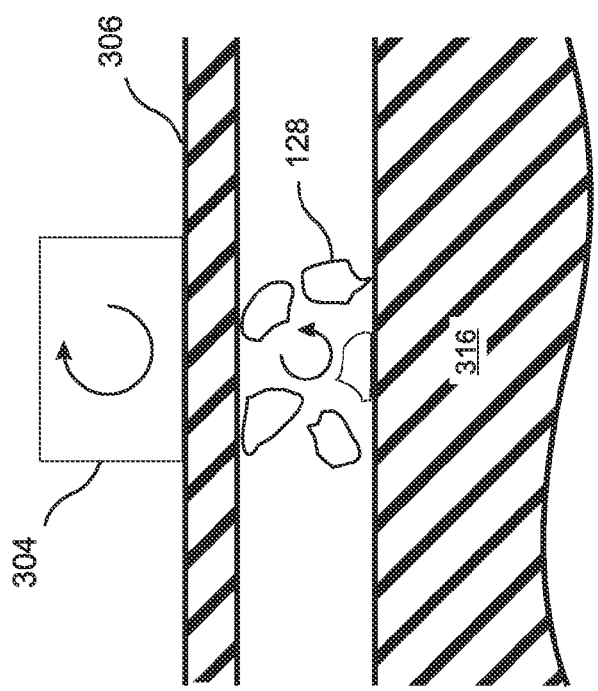
FIG. 3G is a simplified cross-sectional view of a prior art Breton press illustrating the rotary vibration of the vibrating device and the resultant rotary movements of the stone granules in the slab mixture.

Also, as can be seen in FIGS. 3G and 3H, the counter rotation of the top 304A and bottom 304B vibration devises, creates a more intense "jiggling" movement of the stone granules 128.

In FIG. 3G, a Breton-style press of the prior art has a single rotary vibrating deice 304 on top of the press plate 306, and this press plate 306 is pressing down against a non-moving inertial base 316. The movement that is imparted to the stone granules 128 is only rotary, and the movement of the stone granules 128 is hindered by the inertial base 316, especially at the bottom of the slab where the stone granules 128 are nearest to the non-moving inertial base 316. Also, as has been discussed earlier, despite the large mass of the inertial base 316, a large amount of the vibration forces, and the resultant "instantaneous pressing pressure" passes through the slab 312 and out into the surrounding ground and building. Hence a very high vibration energy (about 2 kw/sq ft) must be applied by the Breton Style press (FIG. 3G).

FIG. 3H illustrates the very different and improved result of the two opposed vibrating plates 306A, 306B of the current invention. With the two vibrating devices 304A, 304B rotating at different speeds, for example at 4000 rpm and 2000 rpm respectively, the vibration forces applied to the tone granules 128 "rotates" through all directions of the compass at a rate of 2000 times per minute, or 33 times per second, imparting a much higher "jiggling" displacement and energy to the granules, and causing a much more diverse range of motions of the stone granules 128. Hence, the present invention results in a pressed slab in less time, with less resin, and with only 0.6 kw/sq ft of applied vibration energy.

Figure 4A:
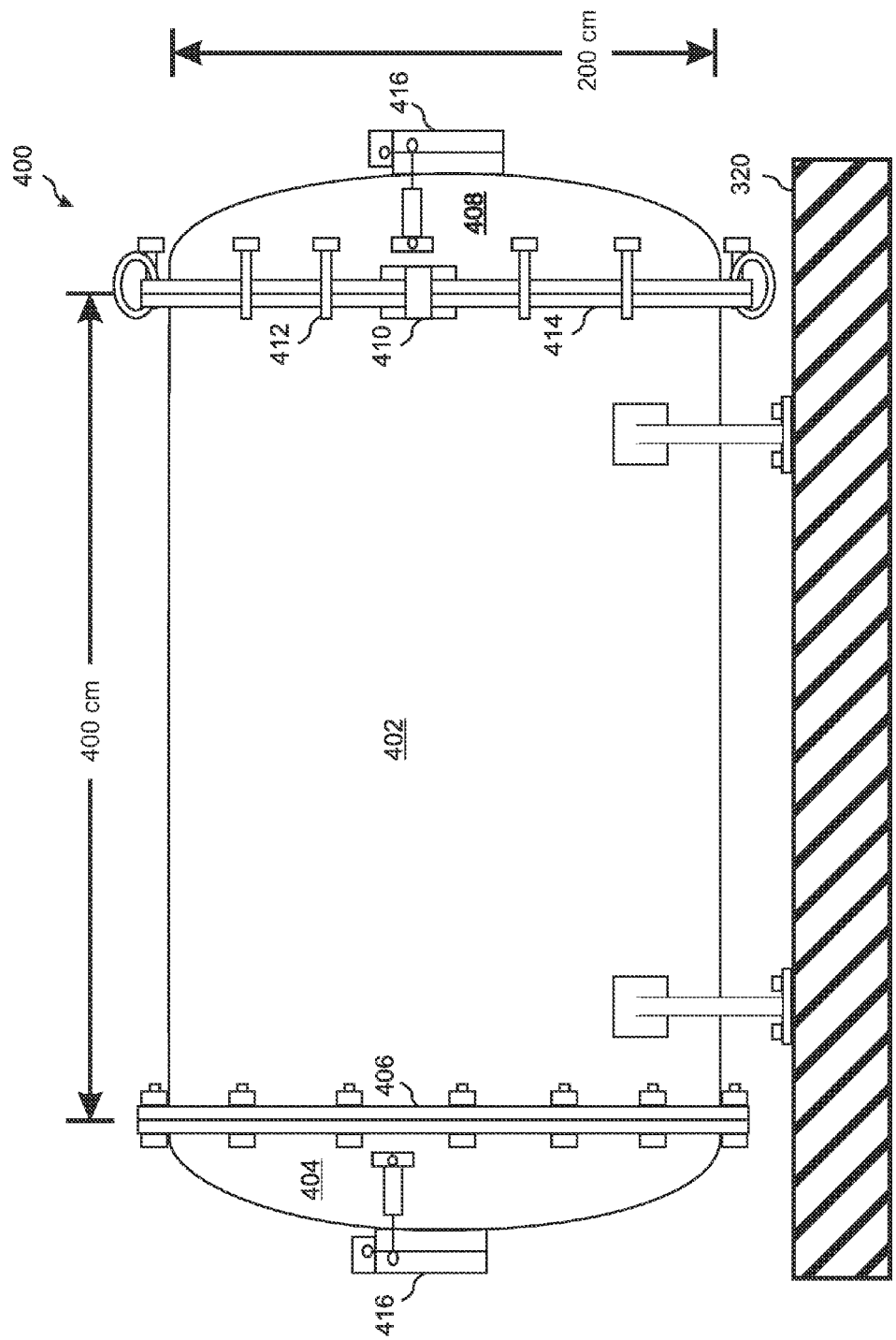
FIG. 4A is a side view of a vacuum chamber in an embodiment of the present invention that includes hinged doors on its ends.
Figure 4B:
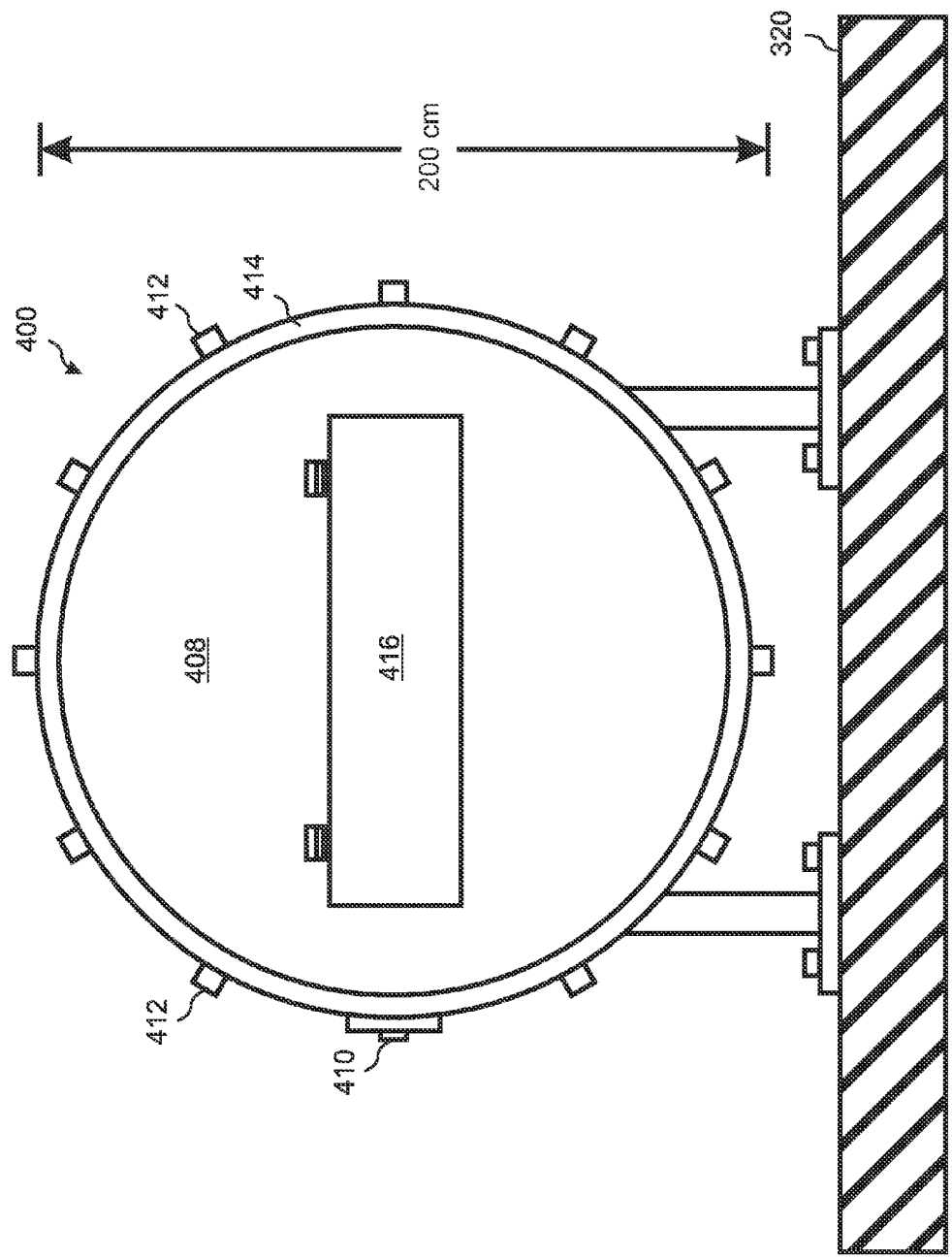
FIG. 4B is an end view of the vacuum chamber of FIG. 4A.

With reference to FIGS. 4A and 4B (side and end views, respectively), instead of a rectangular vacuum chamber with enormous strength and weight, the present invention uses, in embodiments, a light weight cylindrical chamber 400 inside of which the vibration mechanism and slab support are suspended. In the embodiment of FIGS. 4A and 4B, the vacuum chamber includes a cylindrical section 402 terminated at one end by an end cap 404 that is bolted 406 in place and at the other end by an end cap 408 that is hinged 410 and held in place by clamps 412 attached to a flange 414. Both end caps 404, 408 include hinged doors 416 through which a formed slab 312 can be inserted into the press. Because the vacuum chamber itself 400 is not vibrated, in contrast with the traditional Breton type press 300, and is actually isolated from all vibration, virtually any type of design or construction for the vacuum chamber 400 can be used, even a rectangular and massive chamber if so desired.

Figure 5A:
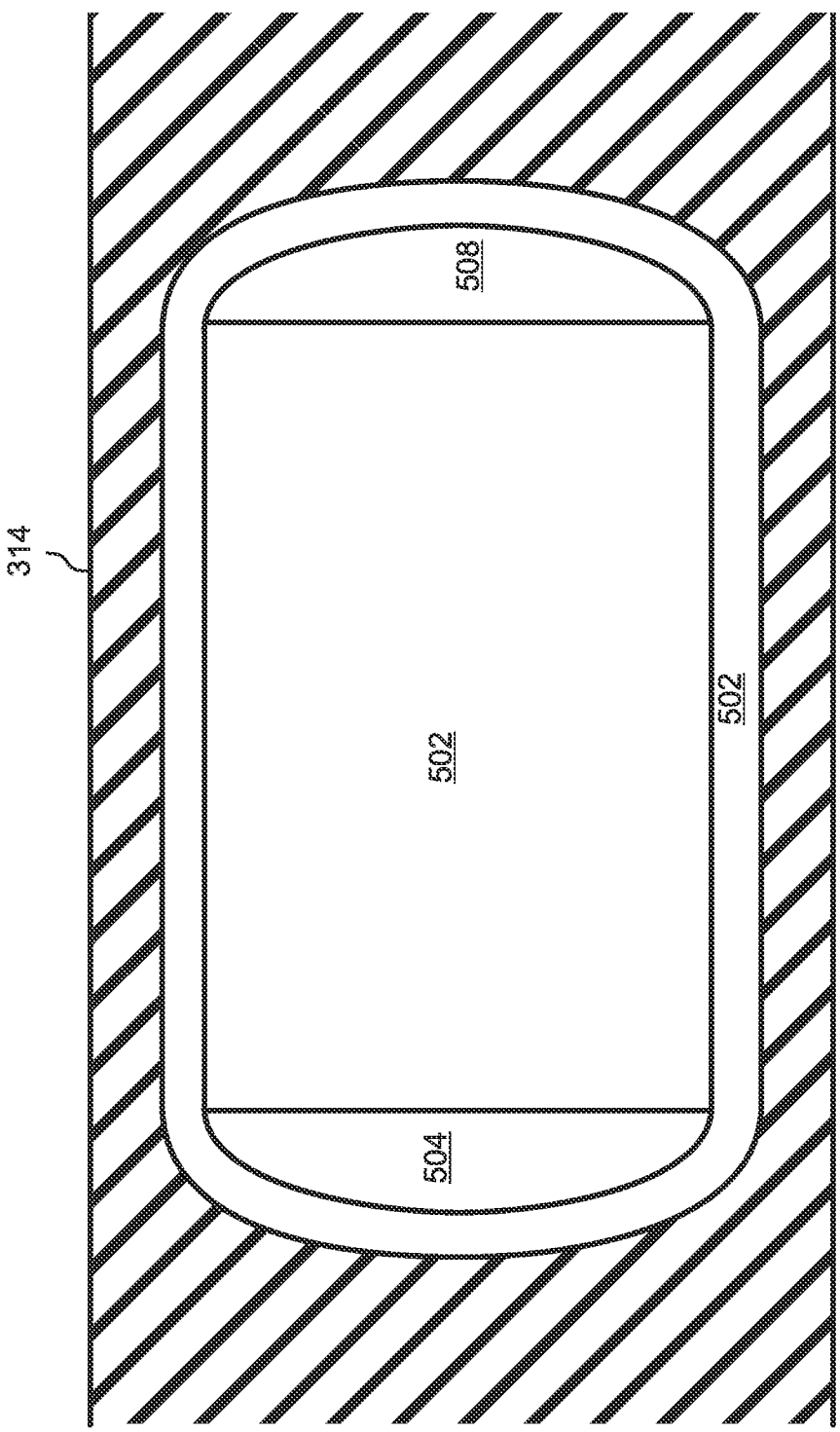
FIG. 5A is a top view of a split vacuum chamber in an embodiment of the present invention showing a conveyor belt wider than the vacuum chamber and passing between the split sections of the vacuum chamber.
Figure 5B:
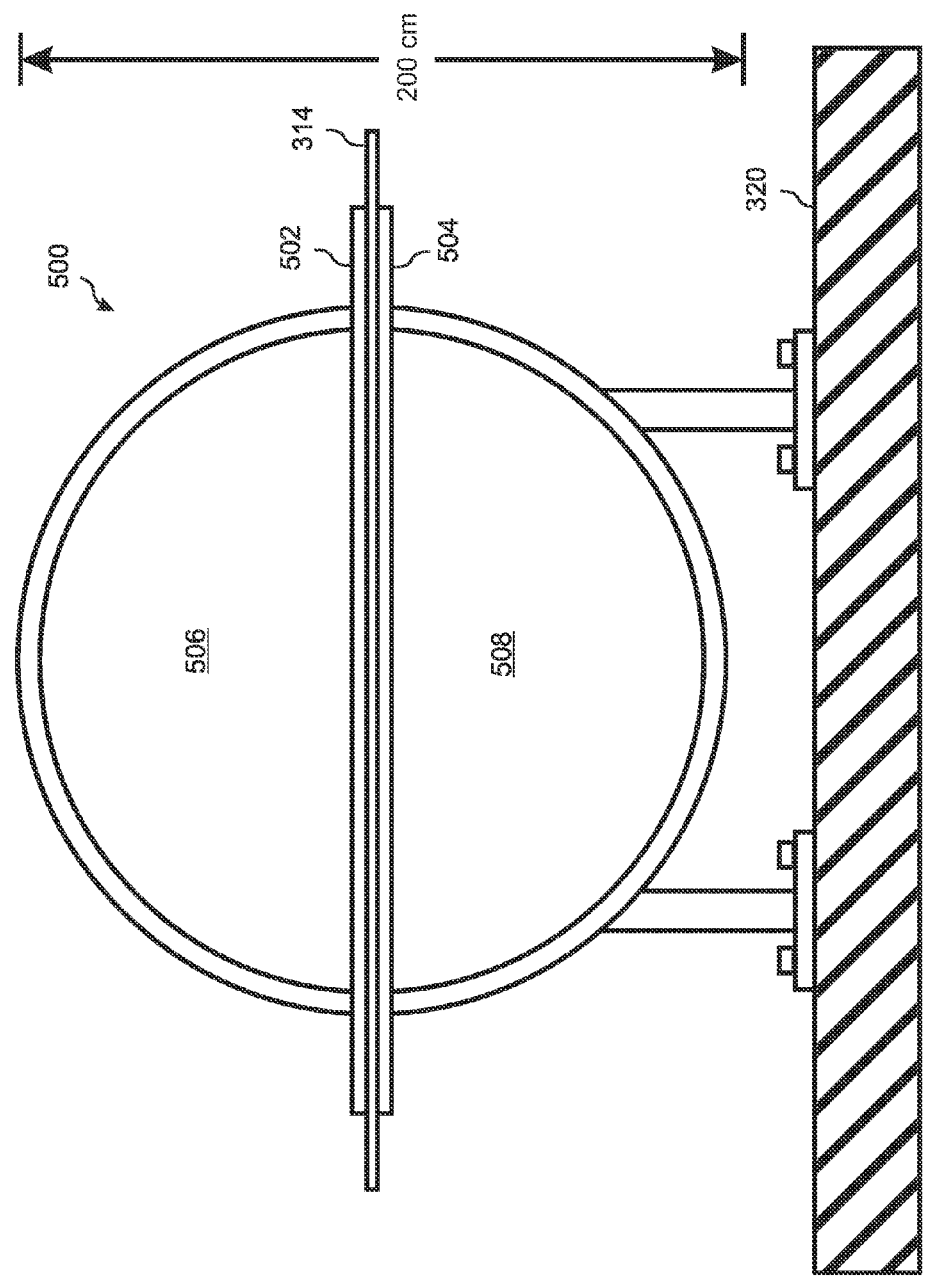
FIG. 5B is a side view of the split vacuum chamber of FIG. 5A.

FIGS. 5A and 5B are top and side views, respectively, of an embodiment that includes a horizontally split vacuum chamber 500 which forms a vacuum seal between the vacuum chamber 500 and a conveyor belt 314, the conveyor belt being wider than the vacuum chamber 500 itself. The conveyor belt 314 passes between an upper flange 502 and a lower flange 504 of the vacuum chamber 500, so as to convey a formed slab 312 between an upper half of the vacuum chamber 506 and a lower half of the vacuum chamber 508.

Figure 6A:
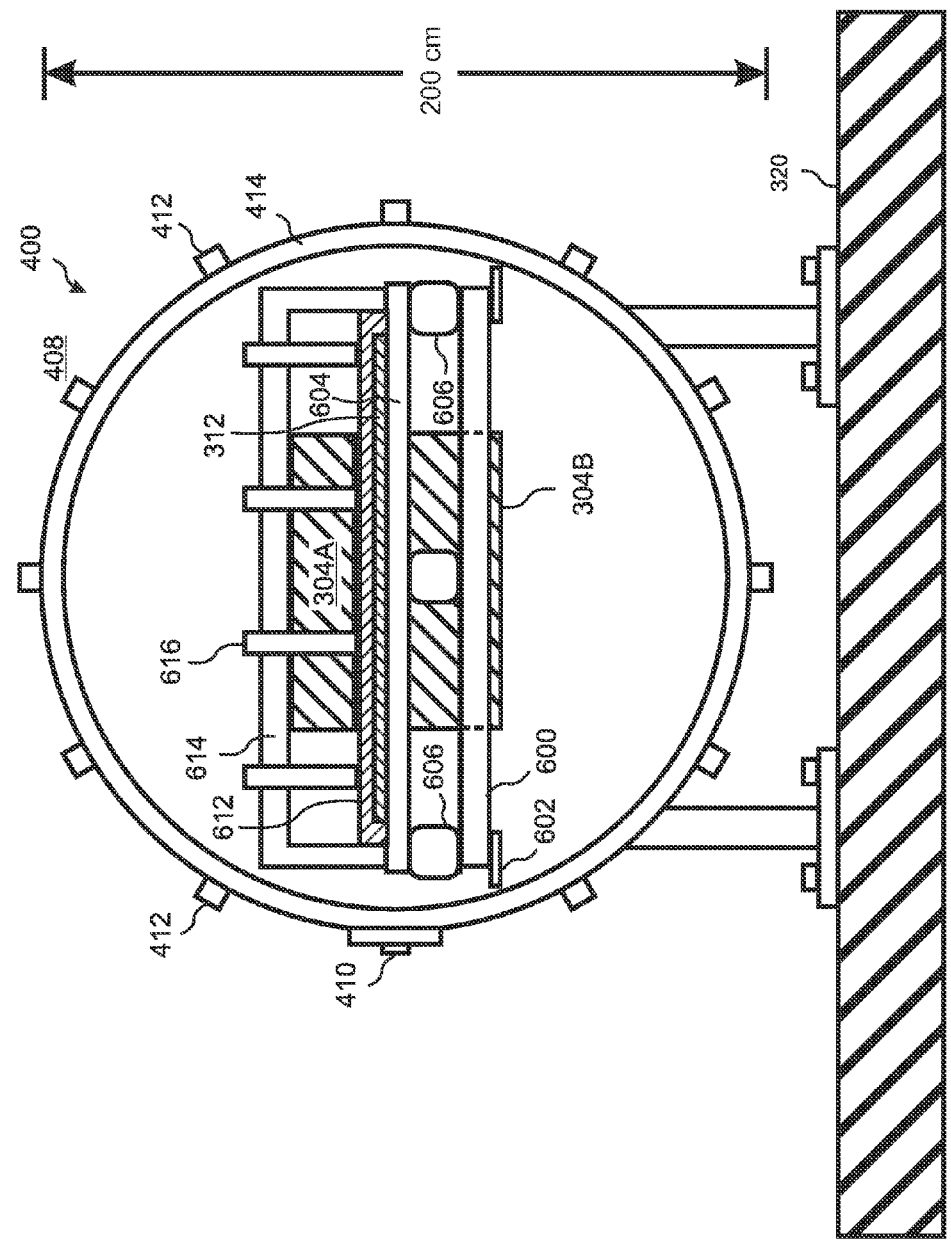
FIG. 6A is a cross-sectional end view of an embodiment of the present invention showing the dual pressing mechanisms within the vacuum chamber.
Figure 6B:
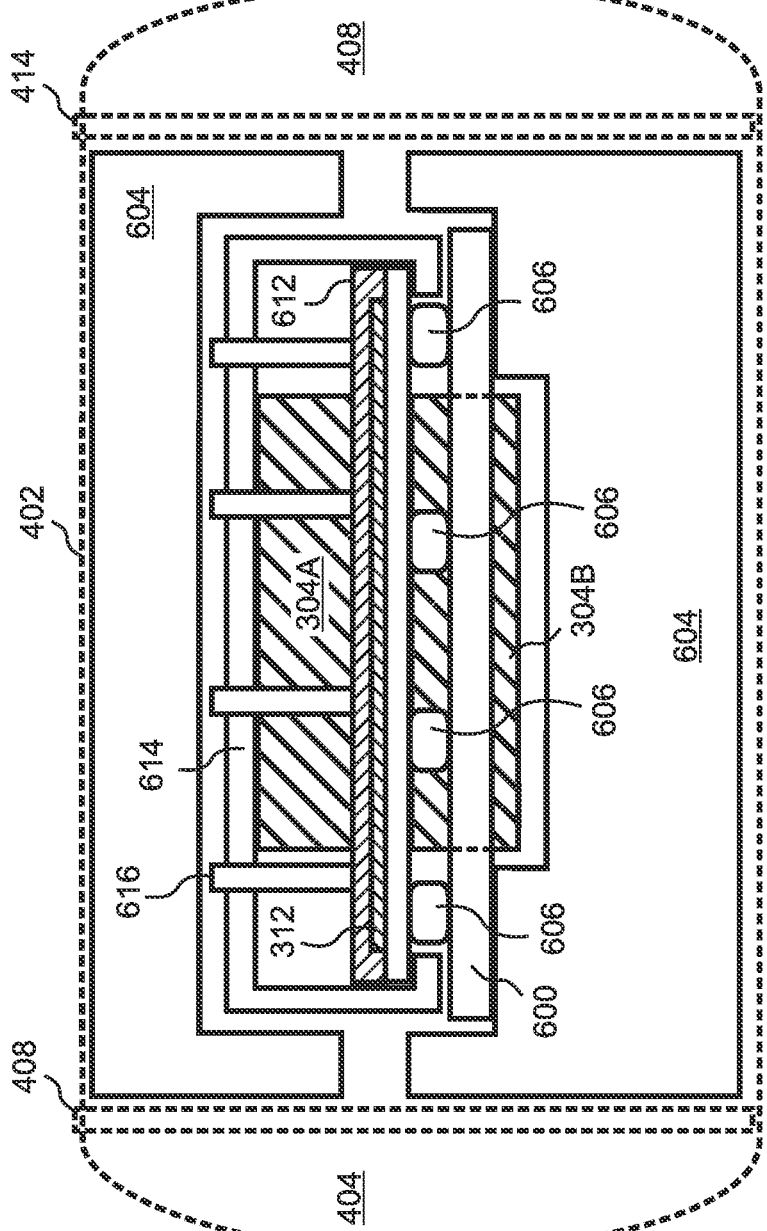
FIG. 6B is a cross-sectional view of the embodiment of FIG. 6A.

With reference to FIGS. 6A and 6B, instead of vibrating a 50,000 to 75,000 pound press 302, 316 and its 300+ ton base concrete block 318 (requiring 100-300 hp), the press 400 of the present invention is only required to vibrate about 3000 to 5000 pounds of machinery and slab, referred to herein as the Vibration and Pressing Mechanism or VPM, which requires only about 15 to 25 hp. The VPM is relatively simple and light, and includes the following elements.

A Vibration Press Table Support Frame-(VPT-SF) 600 is clamped or bolted by tank support brackets 602 to the inside of the vacuum chamber 408, which is cylindrical in the embodiment of FIGS. 6A and 6B. The VPT-SF 600 can be accessed inside the chamber 408 by removing the Vacuum Volume Reduction Blocks (VVRB) 700, or by unclamping, unbolting, and sliding it out of the chamber through the hinged tank head end cap (416 of FIGS. 4A and 4B). In similar embodiments, the VPT-SF can be slid or rolled out from inside the chamber for maintenance purposes, which greatly reduces maintenance times.

Figure 6C:
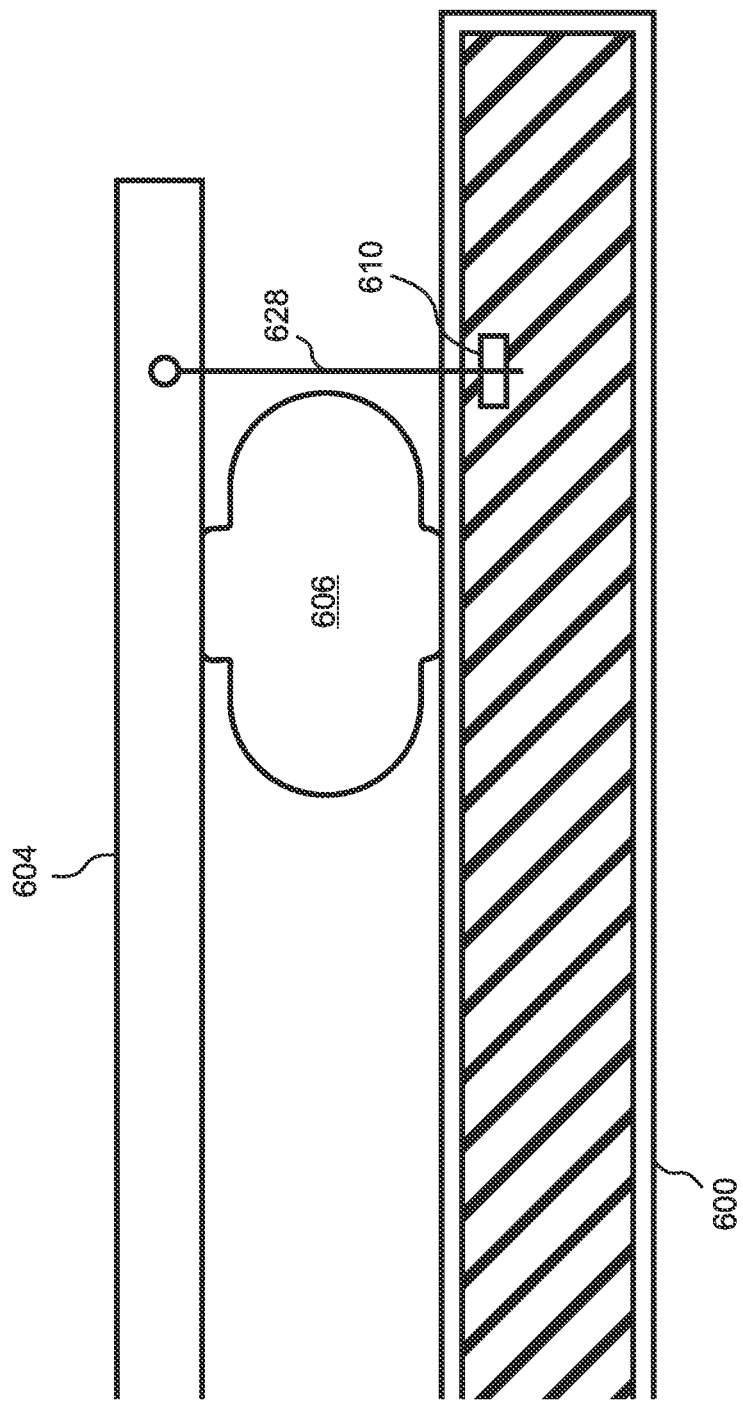
FIG. 6C is a close-up cross-sectional view of the embodiment of FIG. 6B, showing a support mechanism suspending the press table above the press support frame.

A vibrating table 604 is connected and suspended above the support frame 600 by air springs and/or bags 606 with appropriate height restraint and leveling devices (628 in FIG. 6C) to maintain levelness and proper working height. In the embodiment of FIG. 6C, the leveling device includes a metal rod or chain 628 and a height adjusting mechanism 610. In other embodiments, instead of air springs and bags, mechanical springs or another suitable mechanism is used which allows the vibration table 604 to move freely enough for the vibration mode selected and transmitting negligible vibration to the support frame 600 and vacuum chamber 408.

A press plate 612 and pressing mechanism 614 are supported above the formed slab 312 and are lowered, positioned precisely, and vibrated to accomplish the required compaction of the slab material components.

The Vibration Devices (VD) 304, which can be either traditional mechanical vibration devices (driven by pneumatic, electrical, magnetic, hydraulic, or any other devices that create mechanical vibration at a frequency of approximately 100-5000 rpm and amplitude of approximately 0.001 to 1 mm length) and/or ultrasonic transducers (frequency approximately 1000-5 MHz), are mounted to the bottom of the press table 604 and/or to the top of the press plate 612.

With respect to the plane of the slab 312 itself, the vibration mode can be linear or circular, and can be aligned in any desired direction. For example, the vibration mode can be vertical/linear, vertical/circular, horizontal/linear, horizontal/circular, tilted/linear, tilted/circular, or any combination thereof. The VD's cause the quartz slab 312 and the entire vibration press mechanism (only about 3000-5000 pounds of mechanism) to vibrate, but do not cause the vacuum chamber 400 to vibrate appreciably.

Depending on the dimensions of the slab to be pressed, in some embodiments a plurality of VD's 304A, 304B may be mounted either to the bottom of the press table 604 or to the top of the press plate 612, or both (as shown in FIG. 6F). In these embodiments, all of the VD's mounted on the same vibrating plate are synchronized electronically and/or mechanically, so that all of the VD's mounted on the same plate vibrate in phase with one another, both in amplitude and in frequency, causing the plurality of VD's to act as one large vibration device 304A, 304B.

In some embodiments the modes and/or the axial directions of the VD's on the two pres plates are not the same. For example, FIGS. 6G and 6H illustrate embodiments that include a pair of VD's, one 304A on top of the press plate 612 and one 304B below the vibrating table 604. In the embodiment of FIG. 6G, both of the VD's vibrate linearly along a common vertical axis. However, in FIG. 6H the top VD 304A vibrates vertically while the bottom VD 304B vibrates horizontally. The axes of linear vibration in FIG. 6H thereby differ by 90 degrees. In similar embodiments the vibrational axes of the VD's 304A, 304B differ by other angles.

Figure 6D:
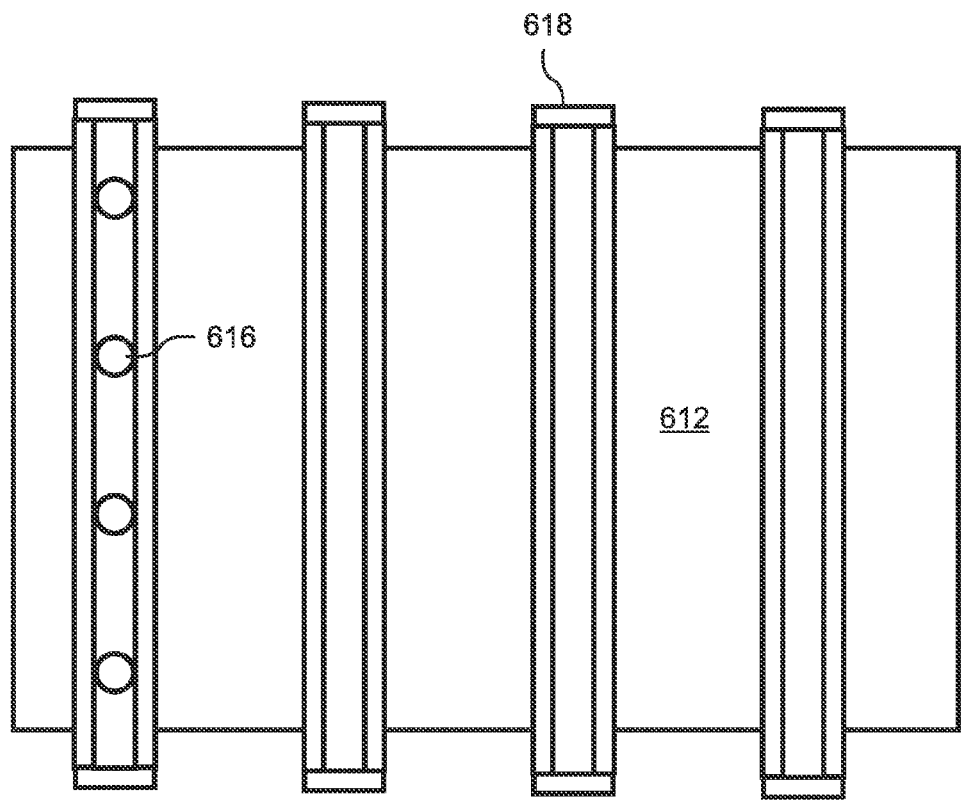
FIG. 6D is a top view of the press plate of FIG. 6A illustrating support of the press plate by a plurality of screw jacks.
Figure 6E:
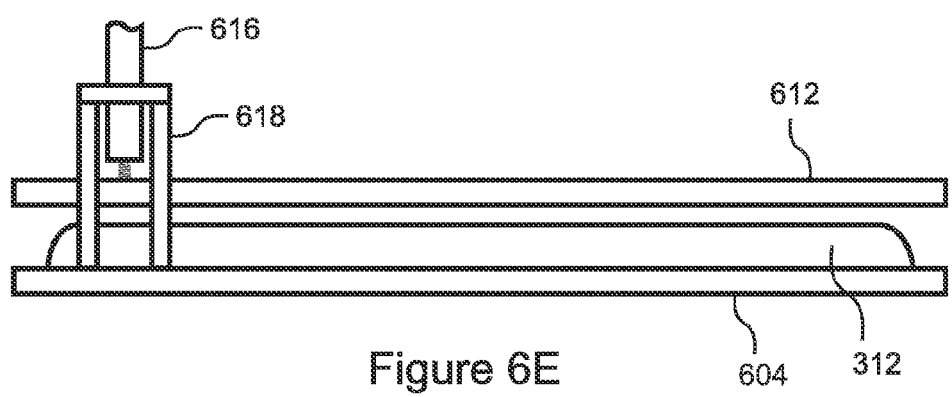
FIG. 6E is a side view of the press plate of FIG. 6D.
Figure 6G:
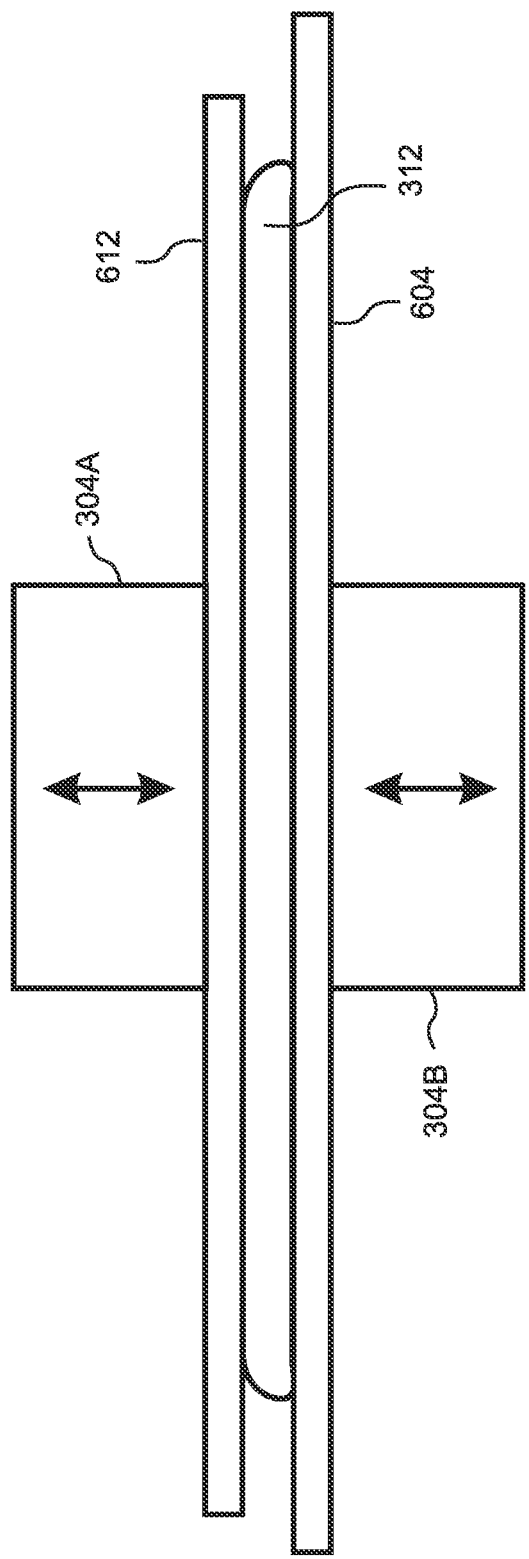
FIG. 6G is a side view of an embodiment that includes upper and lower VD's vibrating linearly along a common axis.
Figure 6H:
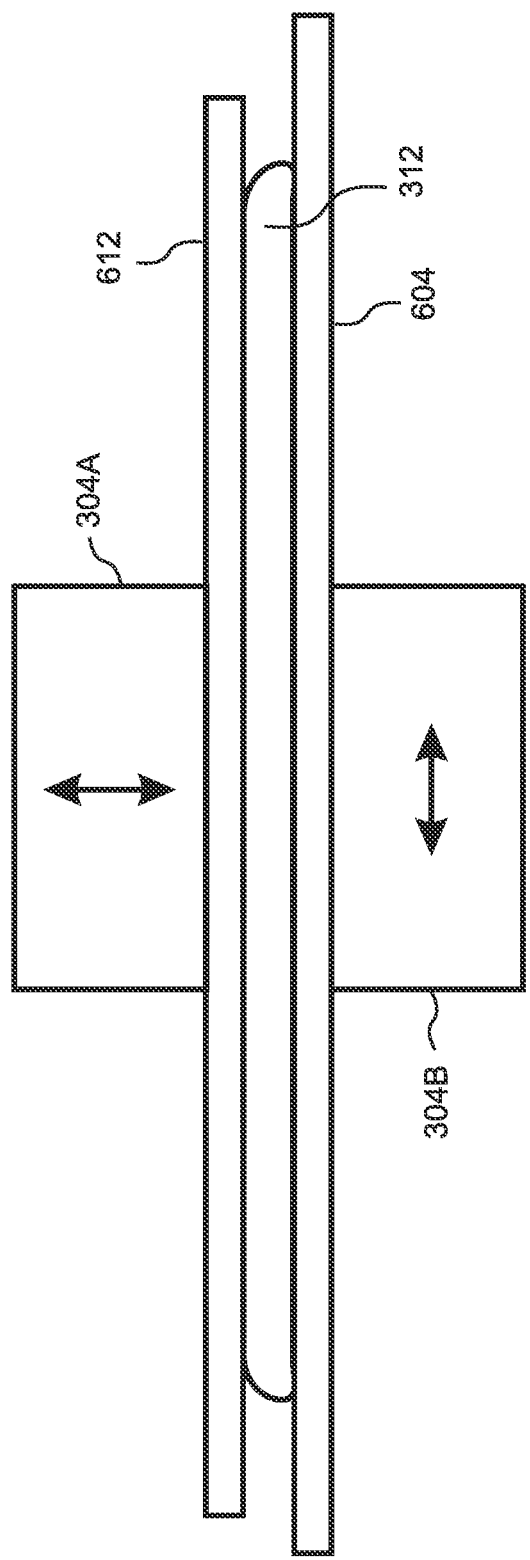
FIG. 6H is a side view of an embodiment that includes upper and lower VD's vibrating linearly along axes that differ in direction by 90 degrees.
Figure 6I:
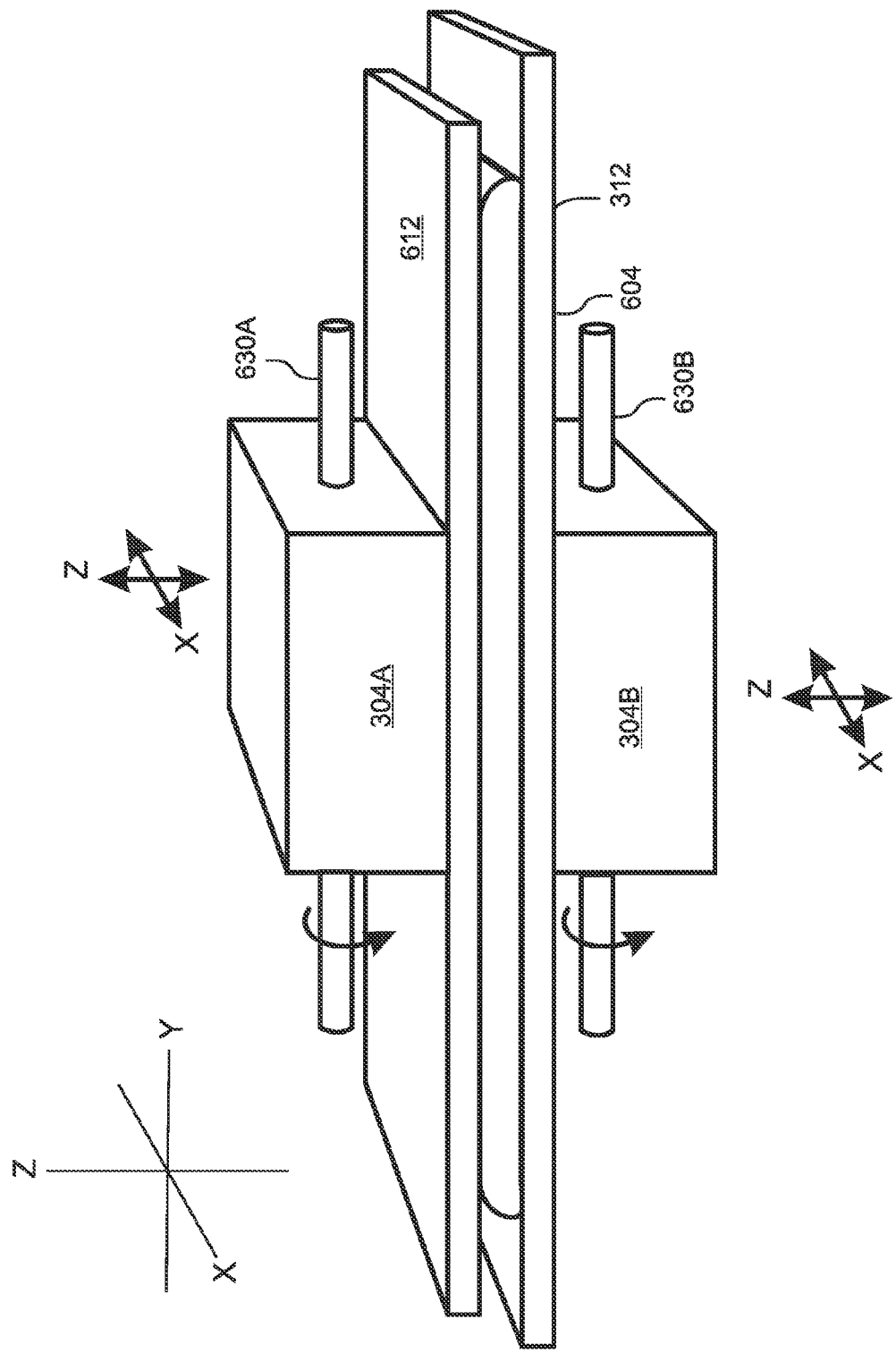
FIG. 6I is a perspective view of an embodiment that includes upper and lower VD's vibrating rotationally about parallel axes.
Figure 6J:
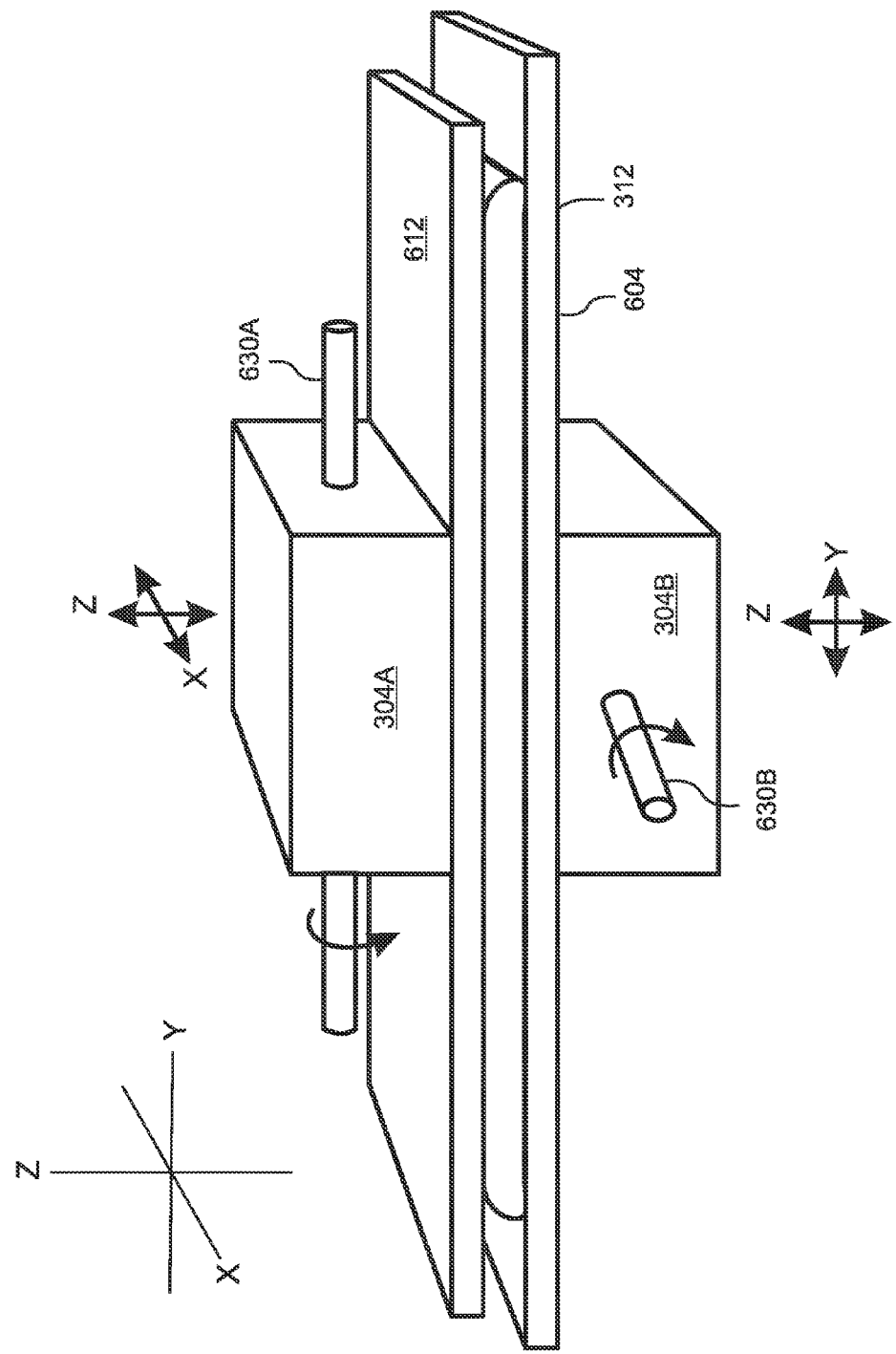
FIG. 6J is a perspective view of an embodiment that includes upper and lower VD's vibrating rotationally about axes that differ in direction by 90 degrees.

The embodiments of FIGS. 6I and 6J are similar to FIGS. 6G and 6H, except that rotary vibration is applied by the VD's 304A, 304B. In FIG. 6G, both of the VD's 304A, 304B have rotational axes that are oriented along the "Y" axis, and apply forces to the slab 312 alternately along the X-axis and the Z-axis.

The embodiment of FIG. 6J is similar to FIG. 6I except that the rotary axes of the VD's 304A, 304B are orthogonal to each other. The top VD 304A rotates about the Y-axis, as in FIG. 6I, and applies forces to the slab 312 alternately in the X and Z directions. The second VD 304B, on the other hand, rotates about the X-axis, and applies forces to the slab 312 alternately in the Y and Z directions.

Figure 6K:
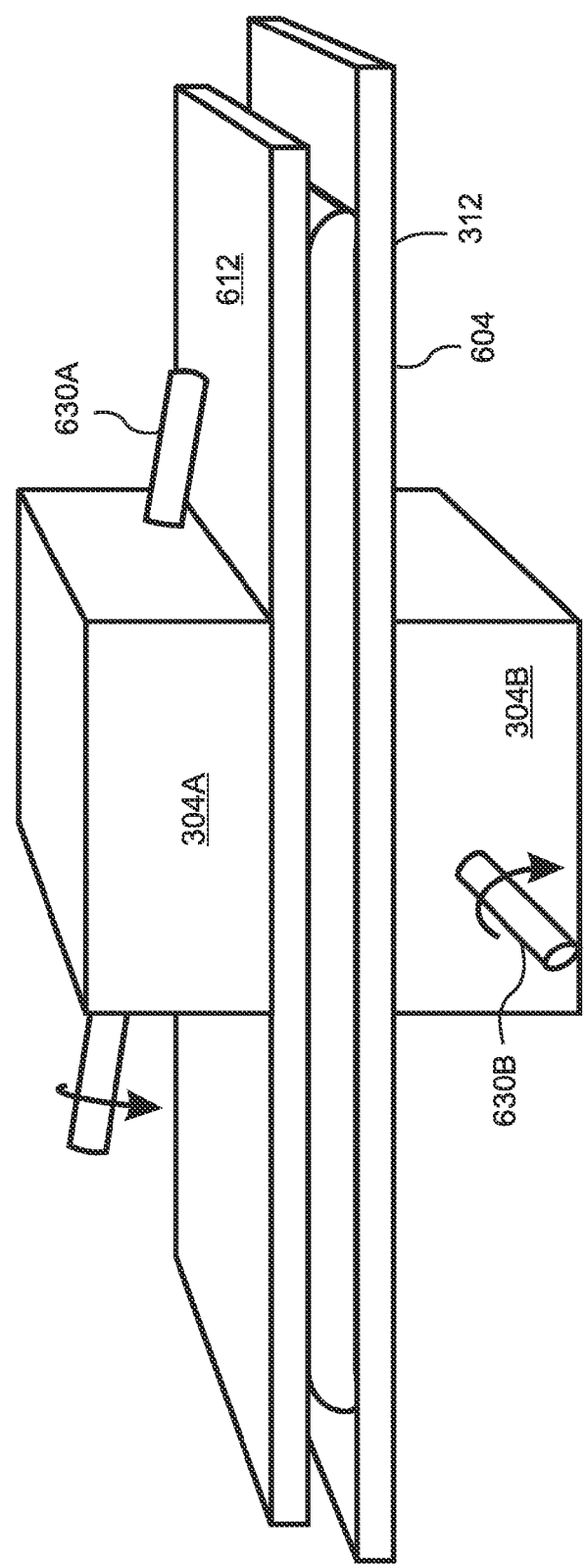
FIG. 6K is a perspective view of an embodiment that includes upper and lower VD's vibrating rotationally about axes that are inclined relative to the plane of the slab and are at an arbitrary angle with respect to each other.

In various embodiments the linear vibration axes or the rotational axes of the VD's 304A, 304B can have any relative angle from zero to 180 degrees. They can vibrate or rotate about axes pointing in the same or in different directions, and they can vibrate or rotate at the same or different rates. If the vibration or rotation rates are the same, the VD's 304A, 304B can have any relative phase relationship. In the embodiment of FIG. 6K, for example, the rotary axes of the VD's 304A, 304B are both inclined relative to slab 312, and are at arbitrary angles relative to each other.

In embodiments where a first group of VD's is attached to the bottom of the press table 604 and a second group of VD's is attached to the top of the press plate 612, each group of VD's is synchronized to vibrate in phase both in amplitude and in frequency within the group. The two groups can be synchronized with each other in any of several ways, including phase and frequency synchronized, so that both the press table 604 and the press plate 612 rise and fall at same time;

frequency synchronized in opposite phase, so that the press table 604 rises when the press plate 612 falls and vice-versa, thereby periodically and simultaneously "pressing" against the quartz slab 304;

frequency synchronized and 90° out of phase, so that as the press plate 612 is going down, the press table 604 is moving laterally;

frequency synchronized and with some other phase offset;

frequency un-synchronized, i.e. the two groups operating at different frequencies;

operating at different amplitudes, so that the vibration applied by the VD's of the first group to the press table is at a different amplitude from the vibration applied by the VD's of the second group to the press plate; and any combination of the above.

Note that embodiments of the present invention apply both mechanical and/or ultrasonic vibrations using any of these combinations of VD's and combinations of phase, frequency, and amplitude synchronization.

With reference to FIGS. 6D and 6E, embodiments of the present invention employ precision screw jacks 616 attached to press screw supports 618 to lower the press plate 612 in preparation for vibration. FIG. 6D is a top view of a press plate 612 suspended by a plurality of screw jacks 616 attached to a plurality of press screw supports 618. FIG. 6E is a side view of the press plate 612, screw jacks 616 and press screw supports 618 of FIG. 6D. In embodiments, the screw jacks 616 can be controlled to lower the press plate 612 at a variable and defined rate of decent to a proper thickness position which will allow the slab material to move or migrate across the slab area, resulting in a very even thickness across the entire slab area. With reference to FIG. 6F, the pressing force of the positioning screw jacks 616 can be augmented with the force of air springs, air bags 620, or other pneumatic or hydraulic pressing devices. In some embodiments, the pressing force is sensed and regulated, either by sensing the pressure in the air bags 620 or by another sensing method, and the positioning of the screw jacks 616 is controlled so as to maintain the press plate 612 parallel to the press table 604.

Because of this method of lowering and positioning the vibrating press plate 612, embodiments of the present invention allow slabs to be produced with less thickness variance from side to side or end to end then for traditional Breton presses 300, thereby reducing the average amount of material that must be used to produce a slab of given finished thickness after grinding. The traditional press technology suspends and lowers the press plate 306 with large air bags and/or air springs 308 and without precision screw jacks 616, and therefore the levelness and parallel-ness of the press plate 306 relative to the press base 316 on which the formed slab 312 rests, is determined only by the levelness of the distribution of the slab material 312 that has been spread in the slab forming process. Therefore, uneven spreading results in uneven slab thickness from end to end or side to side, which means that to maintain a given finished and post calibration slab thickness, the average formed slab thickness before grinding must be greater, and this increases the average amount of slab material (and therefore the cost) of the slab for any given final thickness.

In some embodiments, ultrasonic vibration is applied to the pressing plate 612, the vibration press table 600, 604, or both, which can substantially reduce the pressing cycle time. This is economically possible due to the light weight of the vibrating press plates, their supports 600, 604 and the vibrating devices 304.

In operating a traditional Breton press 300, a significant percentage of the pressing cycle time is devoted to evacuating the vacuum chamber to below 100 Torr (and in some cases even down as low as 1-5 Torr). The volume of the vacuum chamber is a big factor in determining this time. This is one of the reasons for the choice of a low-volume rectangular vacuum chamber for the Breton machine, which of necessity requires massively thick and heavy walls to withstand the vacuum and the vibration.

Figure 7:
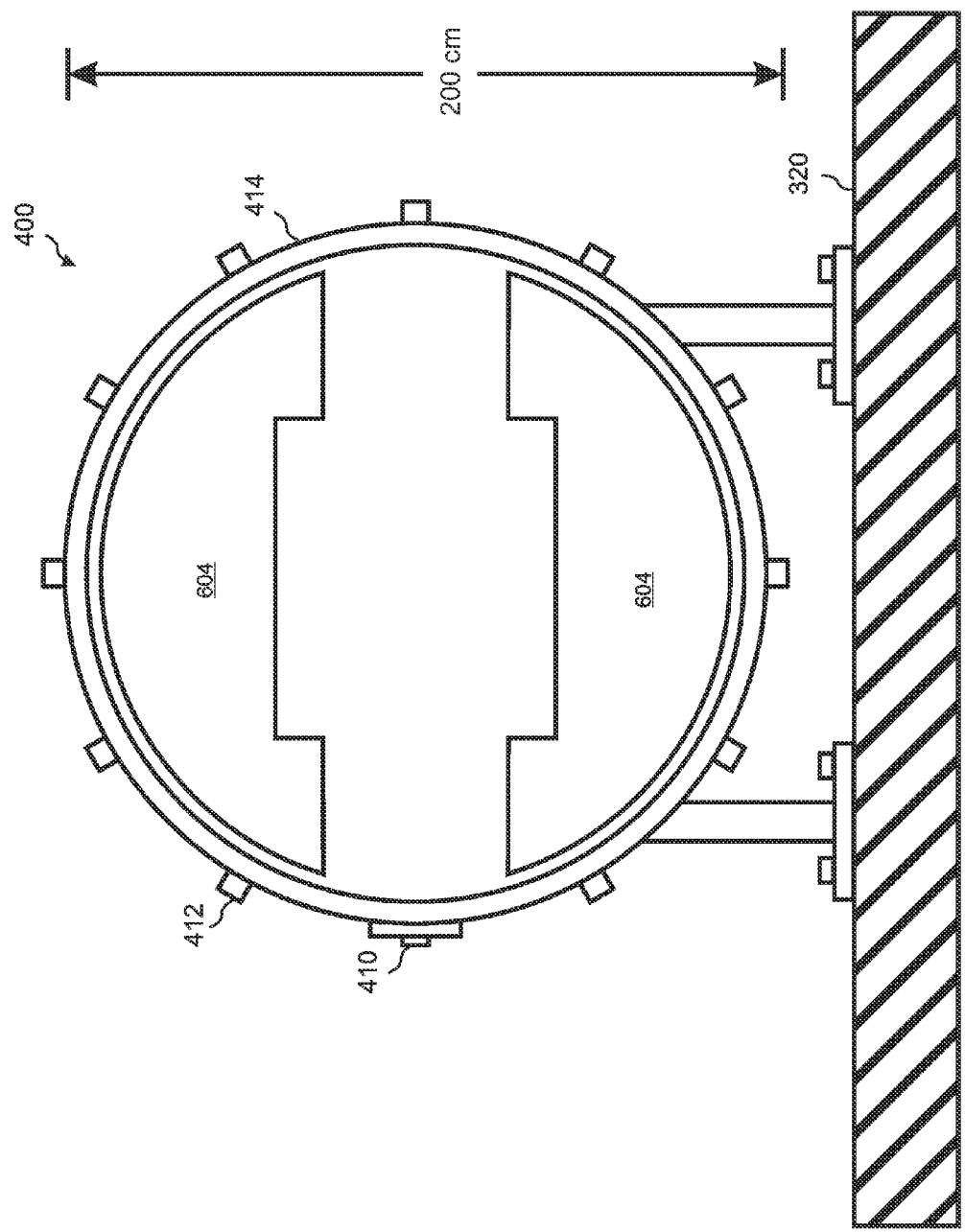
FIG. 7 is a cross-sectional end view of the embodiment of FIG. 6A showing only the vacuum volume reduction blocks within the vacuum chamber.

In embodiments of the present invention, the press uses a lightweight cylindrical vacuum chamber 402 which would normally have a huge interior volume and which would therefore require either massive vacuum pumps or long press cycle times to evacuate. This large chamber volume problem is eliminated by the use of vacuum volume reduction blocks VVRB 700. These are lightweight blocks 700 made from a material such as urethane or another foam, balsa wood, expanded cell plastic, metal, or any other suitable material, which can withstand the vacuum without distending or expanding, and which can effectively and substantially reduce the volume of the vacuum chamber 402 and thereby shorten the press cycle time. An end view showing the VVRB blocks 700 is presented in FIG. 7. The vibration and pressing mechanisms have been omitted from FIG. 7 for clarity of illustration.

Figure 8A:
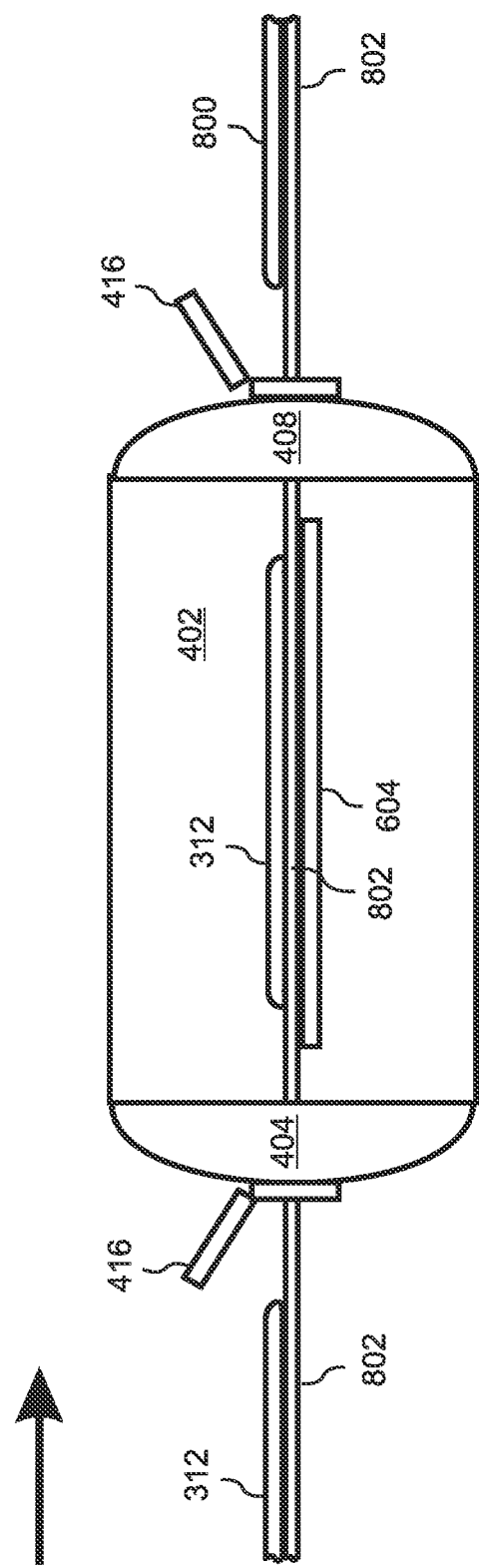
FIG. 8A is a cross-sectional side view showing composite slabs being delivered to and removed from a vacuum chamber of an embodiment by a conveyor belt.
Figure 8B:
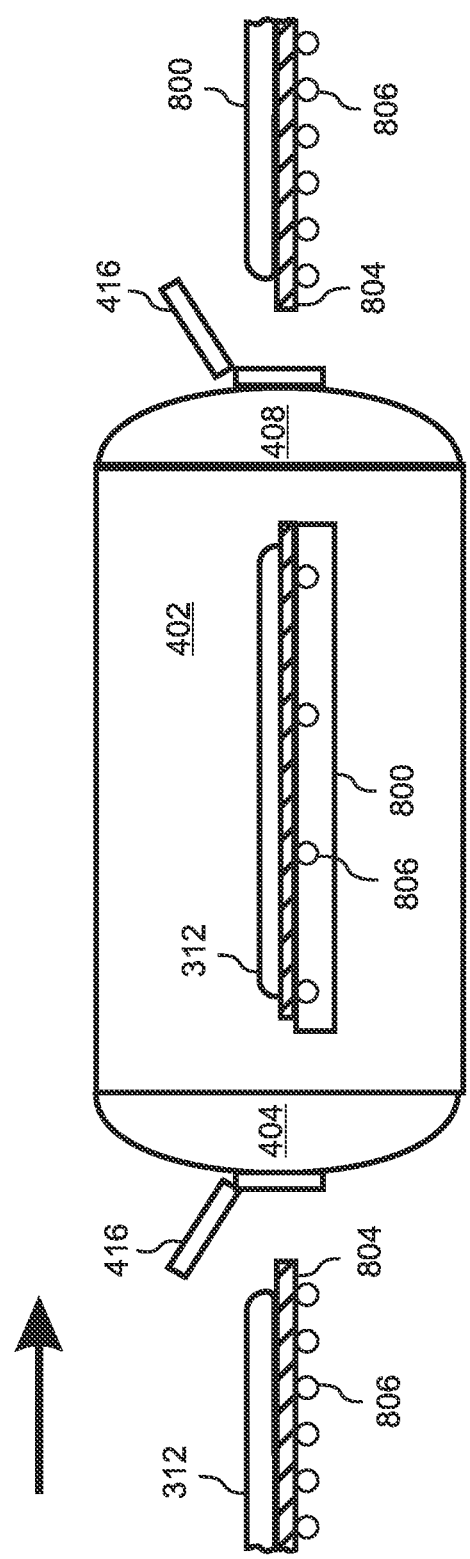
FIG. 8B is a cross-sectional side view showing composite slabs being delivered to and removed from a vacuum chamber of an embodiment in separate trays on rollers.

With reference to FIGS. 8A and 8B, embodiments of the present invention are configured to accept formed slabs 312 and removed finished composite stone slabs 800 via any of several methods. These include slabs 312 carried on a continuous sheet of paper or metal on a conveyor belt 802, slabs 312 contained in rubber trays 804 carried on a conveyor belt 802, and slabs 312 located on individual, self-supporting trays or molds 804 which arrive and depart on rollers 806 or on a conveyor belt 802. In embodiments, the trays or molds 804 can be made from metal, composites, glass, ceramic, or any other suitable, rigid material known in the art.

EXAMPLE

The advantages of the present invention described herein are not mere theory. The inventor has constructed a fully functional prototype device and has tested the present invention to compare its performance with the performance of Breton-style presses.

The slab recipe used for this comparison was as follows: (% by weight)

10.9% Thermosetting polyester resin with required additives for adhesion and curing 24.6% Powdered quartz crystobolite, −45 micron 52.2% White quartz grains 0.4-1.2 mm 10.9% White quartz grains 1.2-2.5 mm 0.6% TiO2 pigment powder The results of pressing this recipe using the prototype of the present invention were compared to slabs manufactured by a well know Bretonstone producer for several years that has produced more than 5000 slabs of the type selected.

| Basic recipe used | Slab as made by a Breton press | Slab made using a prototype of the present invention | Comments |
| --- | --- | --- | --- |
| Resin % | 11.7 | 10.9 | This is a 7% reduction in resin used because of the higher close-packing energy of the present invention |

-continued

| Basic recipe used | Slab as made by a Breton press | Slab made using a prototype of the present invention | Comments |
|---|---|---|---|
| Powder % | 24.6 | 24.6 | |
| Quart grains 0.4-1.2% | 52.2 | 52.2 | |
| Quartx grains 1.2-2.5% | 10.9 | 10.9 | |
| Pigment | 0.6 | 0.6 | |
| Pressing force | 25 psi | 8 psi | |
| Vibrational energy applied | 2 kW/sq. ft. | 0.6 kW/sq. ft. | |
| Pressing time | 75 sec | 60 sec | |
| Result after pressing and polishing | Standard commercial product | Indistinguishable from standard commercial product in appearance, physical, and chemical properties | |

This example, comparing a commercially produced product with a test slab produced by the present invention, shows 5 important distinctions:

First, the required amount of resin was reduced by 7%, resulting in a higher stone granule density and a less costly product.

Second, the pressing cycle time was reduced, enabling greater product throughput in the system.

Third, the applied vibration energy was reduced from 2 kw per sq. ft. down to 0.6 kw per sq. ft.

Fourth, the applied pressure was reduced from 25 psi to only 8 psi.

Fifth, the VVP weight of the present invention in embodiments that are suitable for manufacturing 45 ft² engineered stone SLABS is reduced to only 7 to 10 tons, as compared to the 350 ton weight of a Breton-style VVP used to manufacture engineered stone slabs of the same size.

In addition, it is estimated that a commercial production model of the present invention can be built for a fraction of the cost of a Breton-style device, and will weigh less than 3% of a Breton-style device.

The fact that the applied pressure and the input vibrational energy are both reduced by nearly 70% as compared to the Breton design, while the resulting ES-BS slabs are esthetically and physically equivalent to or better than ES-BS slabs produced using a Breton-style press, in combination with the fact that the weight of the VVP apparatus in the present invention is reduced to 7-10 tons as compared to 350 tons for a Breton press, demonstrates that the present invention is many times more efficient in transferring pressing and vibrational energy into the slab material as compared to the Breton design, and is clear evidence that the present invention is novel and non-obvious in comparison to the Breton design, which represents the only relevant prior art.

Engineered stone is most commonly manufactured as a flat slab. Accordingly, most of the description and examples provided herein refer to engineered stone "slabs." However, by appropriate shaping of the mold and/or of the pressing plate of the pressing mechanism, the present invention can be adapted to the production of engineered stone products that are not flat slabs.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

I claim:

1. A method of manufacturing an engineered stone product, the method comprising:
mixing stone granules and stone powder with a resin binder to form an engineered stone mixture containing no more than 15% resin binder by weight;
pouring the engineered stone mixture onto a horizontal mixture support;
locating and supporting the horizontal mixture support on a vibration table within a vacuum chamber;
bringing a pressing mechanism located within the vacuum chamber into contact with a top of the engineered stone mixture, the engineered stone mixture being thereby sandwiched between the vibration table and the pressing mechanism;
creating a vacuum within the vacuum chamber;
applying pressure to compress the engineered stone mixture between the pressing mechanism and the vibration table, while simultaneously applying vibrational energy to the pressing mechanism from above and to the vibration table from below, said vibrational energy being thereby transmitted into the engineered stone mixture;
continuing to apply said pressure and said vibrational energy within said vacuum until all remaining spaces between said stone granules and stone powder are filled by the resin binder, and all voids within the engineered stone mixture are eliminated; and
allowing the engineered stone mixture to cure and harden into an engineered stone product.

2. The method of claim 1, wherein the engineered stone product is an engineered stone slab having an area between 43 square feet and 60 square feet, and a thickness between 5 mm and 50 mm.

3. The method of claim 1, wherein a total of no more than 0.6 kW per square foot of combined vibrational energy is applied to the pressing mechanism from above, and a total of no more than 0.6 kW per square foot of combined vibrational energy is applied to the vibration table from below.

4. The method of claim 1, wherein no more than 10 psi of pressure is applied to the engineered stone mixture.

5. The method of claim 1, wherein the vibrational energy applied to the pressing mechanism differs in frequency from the vibrational energy applied to the vibration table.

6. The method of claim 1, wherein applying vibrational energy includes applying at least one of mechanical and ultrasonic vibrational energy.

7. The method of claim 1, wherein supporting the horizontal mixture support within the vacuum chamber includes inhibiting transmission of vibrational energy from the horizontal mixture support to the vacuum chamber by supporting the horizontal mixture support using a support mechanism that includes at least one of a spring, an elastomer, and an air cushion.

8. The method of claim 1, further comprising using a transport mechanism to transport the slab mixture into and out of the vacuum chamber.

9. The method of claim 8, wherein the transport mechanism includes a conveyor belt.

10. The method of claim 1, wherein the horizontal mixture support is rigid and self-supporting.

11. The method of claim 10, wherein the horizontal mixture support is a tray or mold.

12. The method of claim 10, further comprising using rollers to transport the slab mixture into and out of the vacuum chamber.

13. The method of claim 1, further comprising at least one vacuum volume reduction block within the vacuum chamber, the vacuum volume reduction block being configured to fill space within the vacuum chamber so as to reduce an evacuation volume that is subject to evacuation within the vacuum chamber.

14. The method of claim 1, further comprising using at least one space-adjusting mechanism to adjust a spacing between the pressing mechanism and the top of the engineered stone mixture in the horizontal mixture support, so as to produce an engineered stone product having a uniform thickness.

15. The method of claim 14, wherein the space-adjusting mechanism includes a screw jack.

16. The method of claim 1, wherein the pressing mechanism includes at least one of an air bag, an air cylinder, and a spring.

17. The method of claim 1, wherein the vibrational energy applied from above to the pressing mechanism differs in amplitude from the vibrational energy applied from below to the vibration table.

18. The method of claim 1, wherein the vibrational energy is applied from above to the pressing mechanism and from below to the vibration table by a plurality of vibration devices, said vibration devices including at least one upper vibration device in mechanical communication with the pressing mechanism and at least one lower vibration device in mechanical communication with the vibration table.

19. The method of claim 18, wherein the plurality of vibration devices includes at least one of a plurality of upper vibration devices and a plurality of lower vibration devices.

20. A lightweight, energy efficient, low cost vacuum vibration press for forming an engineered stone product by simultaneously compressing and vibrating under vacuum an engineered stone mixture, the press comprising:
- a vacuum chamber;
- a vibration table configured to support the engineered stone mixture, said vibration table being located within the vacuum chamber;
- a pressing mechanism configured to compress the engineered stone mixture between the pressing mechanism and the vibration table, said pressing mechanism being located within the vacuum chamber;
- a first vibration device attached to a bottom of the vibration table; and
- a second vibration device attached to a top of the pressing mechanism;
- the pressing mechanism and the vibration devices being configured to apply compressional and vibrational forces to the slab mixture that are sufficient to force the stone granules in a slab mixture having at least 85% stone granules and stone powder, and no more than 15% resin into a configuration in which the resin and stone powder fill substantially all voids between the stone granules.

\* \* \* \* \*